(12) United States Patent
Fernandez

(10) Patent No.: US 7,980,341 B2
(45) Date of Patent: Jul. 19, 2011

(54) TELEMATIC METHOD AND APPARATUS WITH INTEGRATED POWER SOURCE

(75) Inventor: Dennis Sunga Fernandez, Atherton, CA (US)

(73) Assignee: Dennis S. Fernandez, Atherton, CA (US)

( * ) Notice: Subject to any disclaimer, the term of this patent is extended or adjusted under 35 U.S.C. 154(b) by 38 days.

(21) Appl. No.: 12/556,573

(22) Filed: Sep. 10, 2009

(65) Prior Publication Data
US 2010/0000810 A1 Jan. 7, 2010

Related U.S. Application Data

(60) Division of application No. 12/237,977, filed on Sep. 25, 2008, now Pat. No. 7,621,361, which is a continuation of application No. 11/288,724, filed on Nov. 28, 2005, now Pat. No. 7,374,003, which is a continuation of application No. 10/626,877, filed on Jul. 23, 2003, now Pat. No. 7,353,897.

(51) Int. Cl.
*B60W 20/00* (2006.01)

(52) U.S. Cl. ............. 180/65.275; 903/944; 701/22

(58) Field of Classification Search ........... 180/65.265, 180/65.275, 65.29, 65.8; 903/908, 944; 701/22
See application file for complete search history.

(56) References Cited

U.S. PATENT DOCUMENTS

| | | | |
|---|---|---|---|
| 3,114,127 A | 12/1963 | Ramsey James | |
| 4,677,257 A | 6/1987 | Ogasawara | |
| 4,792,648 A | 12/1988 | Ogasawara | |
| 5,036,314 A | 7/1991 | Barillari et al. | |
| 5,198,899 A | 3/1993 | Cang | |
| 5,331,640 A | 7/1994 | Ledu | |
| 5,366,821 A | 11/1994 | Merritt | |
| 5,442,553 A | 8/1995 | Parrillo | |
| 5,514,920 A | 5/1996 | Key | |
| 5,605,770 A | 2/1997 | Andreoli | |
| 5,819,039 A | 10/1998 | Morgaine | |
| 5,905,360 A | 5/1999 | Ukita | |
| 5,925,476 A | 7/1999 | Kawatsu | |
| 5,993,986 A | 11/1999 | Wallin | |
| 5,999,864 A | 12/1999 | Thiel et al. | |

(Continued)

FOREIGN PATENT DOCUMENTS

DE 101 41 190 A1 4/2003

(Continued)

OTHER PUBLICATIONS

Arlington, et al. 'Pharma 2010: The Threshold of Innovation,' IBM Business Consulting Services, Future Series Executive Summary [online], Nov. 2002 [retrieved on Jul. 16, 2000]. Retrieved from the Internet: <URL: http://www.pharmamanufacturing.com/Media/MediaManager/ibm_pharma2010_threshold-of-innovation.pdf>.

(Continued)

*Primary Examiner* — John Walters
(74) *Attorney, Agent, or Firm* — Fernandez & Associates, LLP

(57) ABSTRACT

Telematic method and apparatus adaptively uses fuel cell power source in vehicle with integrated power system, electrical system, telematic system, and body/powertrain system. Telematic communications systems including internet, digital video broadcast entertainment, digital audio broadcast, digital multimedia broadcast, global positioning system navigation, safety services, intelligent transportation systems, and/or universal mobile telecommunications system. Network-accessible software enables integrated modular function for automated control and provision of fuel cell resources for telematic appliance and/or other vehicle electro-mechanical devices.

4 Claims, 14 Drawing Sheets

U.S. PATENT DOCUMENTS

| | | | |
|---|---|---|---|
| 6,001,499 | A | 12/1999 | Grot et al. |
| 6,116,368 | A | 9/2000 | Lyons et al. |
| 6,242,873 | B1 | 6/2001 | Drozdz |
| 6,271,745 | B1 | 8/2001 | Anzai |
| 6,282,491 | B1 | 8/2001 | Bochmann et al. |
| 6,339,736 | B1 * | 1/2002 | Moskowitz et al. ............ 701/29 |
| 6,426,709 | B1 | 7/2002 | Becker |
| 6,484,830 | B1 | 11/2002 | Gruenwald et al. |
| 6,541,144 | B2 | 4/2003 | Gyoten et al. |
| 6,541,941 | B2 | 4/2003 | Adams et al. |
| 6,544,675 | B1 | 4/2003 | Kurita |
| 6,551,731 | B1 | 4/2003 | Berg et al. |
| 6,555,989 | B1 | 4/2003 | Pearson |
| 6,624,529 | B2 | 9/2003 | Obayashi |
| 6,738,914 | B2 | 5/2004 | Christopher |
| 6,766,873 | B2 | 7/2004 | Chernoff et al. |
| 6,810,309 | B2 | 10/2004 | Sadler et al. |
| 6,824,281 | B2 | 11/2004 | Schofield et al. |
| 6,853,894 | B1 * | 2/2005 | Kolls ............................. 701/29 |
| 6,879,054 | B2 | 4/2005 | Gosselin |
| 6,901,302 | B2 | 5/2005 | Kami |
| 6,909,200 | B2 | 6/2005 | Bouchon |
| 6,959,777 | B2 | 11/2005 | Beckerman et al. |
| 7,014,001 | B2 | 3/2006 | Beckerman et al. |
| 7,031,844 | B2 | 4/2006 | Bozinov |
| 7,350,608 | B2 | 4/2008 | Fernandez |
| 7,353,897 | B2 | 4/2008 | Fernandez |
| 7,374,003 | B1 | 5/2008 | Fernandez |
| 7,391,299 | B2 | 6/2008 | Bender et al. |
| 7,575,080 | B2 | 8/2009 | Fernandez |
| 7,621,361 | B1 | 11/2009 | Fernandez |
| 2002/0072399 | A1 | 6/2002 | Fritz |
| 2002/0136939 | A1 | 9/2002 | Grieve et al. |
| 2003/0066695 | A1 | 4/2003 | Beckerman et al. |
| 2003/0105562 | A1 | 6/2003 | Hsiao et al. |
| 2003/0205936 | A1 | 11/2003 | Beckerman et al. |
| 2003/0209893 | A1 | 11/2003 | Breed et al. |
| 2003/0230443 | A1 * | 12/2003 | Cramer et al. ............... 180/65.5 |
| 2003/0236596 | A1 | 12/2003 | Eisenmann et al. |
| 2004/0034460 | A1 | 2/2004 | Folkerts et al. |
| 2004/0083039 | A1 | 4/2004 | Hunt |
| 2004/0176935 | A1 | 9/2004 | Sproule |
| 2004/0179391 | A1 | 9/2004 | Bhattacharyya |
| 2004/0195014 | A1 | 10/2004 | Chernoff |
| 2004/0204797 | A1 * | 10/2004 | Vickers ............................ 701/1 |
| 2004/0267410 | A1 | 12/2004 | Duri et al. |
| 2005/0017899 | A1 | 1/2005 | Cervinka et al. |
| 2005/0029869 | A1 | 2/2005 | Teran et al. |
| 2005/0060067 | A1 * | 3/2005 | Nishida ............................ 701/2 |
| 2007/0051544 | A1 | 3/2007 | Fernandez |
| 2010/0098976 | A1 | 4/2010 | Yeh |

FOREIGN PATENT DOCUMENTS

| | | |
|---|---|---|
| DE | 102 47 392 A1 | 4/2003 |
| DE | 10141190 A1 | 4/2003 |
| DE | 10247392 A1 | 4/2003 |
| DE | 10 2004 035 642 A1 | 12/2005 |
| EP | 1405769 A1 | 4/2004 |
| JP | 11-073594 A | 3/1999 |
| JP | 2000-123291 A | 4/2000 |
| JP | 2001-008274 A | 1/2001 |
| JP | 2003233428 | 8/2003 |
| JP | 2004-215047 | 2/2005 |

OTHER PUBLICATIONS

Birch, Stuart, 'Chassis Systems Integration.' Automotive Engineering International, Jun. 2003, p. 58-66.

Birch, Stuart. 'Hi-Tech Europe.' Automotive Engineering International, Jun. 2003, p. 48.

'Volvo Concept Stresses Electronic Versatility.' Automotive Engineering International, Jun. 2003, p. 34.

Ball, Stuart. 'Exploring Optical and Magnetic Sensors.' Embedded, [Jun. 17, 2003]. Retrieved from the Internet <URL:www.embedded.com/showArticle.jhtml?articleID=10700612>.

Murray, Charles J. 'Analog Devices Rolls Out Low-End Telematics Platform,' EE Times, Jul. 7, 2003, Park Ridge, IL.

Lapedus, Mark. 'Amkor Provides Glimpse of Future IC-Packages.' EE Times, Jul. 3, 2003, Chandler, AZ.

Murray, Charles J. 'Motorola Unveils Low-Power Tire Sensor.' EE Times, May 20, 2003, Park Ridge, IL.

Huang, Gregory T. 'Casting the Wireless Sensor Net.' Technology Review, Jul./Aug. 2003.

Johnson, R. Colin. 'Tetrapod Nanocrystals Could Improve Solar Cells.' EE Times, Jun. 9, 2003, Portland, OR.

Altera Corporation. 'Next Generation Car Network: Vehicle Controls,' Altera Corporation Website [online], Apr. 2003 [retrieved on Aug. 28, 2009]. Retrieved from the Internet: <URL: http://web.archive.org/web/20030801232943/altera.com/solutions/auto/layout/aut-typical__car__network.html>.

Altera Corporation. 'Automotive Gateway Controller & AutoPC: Driver Information,' Altera Corporation Website [online], Apr. 2003 [retrieved on Aug. 28, 2009]. Retrieved from the Internet <URL: http://web.archive.org/web/20030604090519/altera.com/solutions/auto/gateway/aut-gateway.html>.

Altera Corporation. 'Automotive Market Requirements: Software Defined Radio,' Altera Corporation Website [online], Apr. 2003 [retrieved on Aug. 28, 2009]. Retrieved from the Internet <URL: http://web.archive.org/web/20030604163707/altera.com/solutions/auto/market/aut-market__requirements.html>.

Altera Corporation. 'Telematics/Entertainment System: Telematics System,' Altera Corporation Website [online], Apr. 2003 [retrieved on Aug. 28, 2009], Retrieved from the Internet <URL: http://web.archive.org/web/20030604164734/altera.com/solutions/auto/system/aut-telematics__system.html>.

Altera Corporation. Telematics/Entertainment Controller: Telematics Controller, Altera Corporation Website [online], Apr. 2003 [retrieved on Aug. 28, 2009]. Retrieved from the Internet: <URL: http://web.archive.org/web/20030604090054/altera.com/solutions/auto/controller/aut-telematics__controller.html>.

Ultralife Batteries—Markets: Automotive, Ultralife Batteries, Inc., The New Power Generation [online], Jun. 2001 [retrieved on Sep. 3, 2009]. Retrieved from the Internet: <URL: http://web.archive.org/web/20010616124638/http://www.ulbi.com/market-display.asp?ID=6>.

End Markets: Refernce Boards: Acunia CarCube Reference Board. Xilinix, Inc. [online], Jan. 2003 [retrieved on Sep. 1, 2009]. Retrieved from the Internet: <URL: http://web.archive.org/web/*/http://university.xilinx.com/esp/>.

Murray, Charles J. 'Car Markers Turn Toward 42-Volt Systems,' EE Times, Sep. 9, 2002, Cleveland.

Heiss, Janice J. 'The Network is the Car—Driven by Java Technology,' Sun Microsystems, Inc. [online], Jun. 1999 [retrieved on Sep. 13, 2009]. Retrieved from the Internet: <URL: http://web.archive.org/web/19991022043004/java.sun.com/features/1999/06/concept__car.html>.

Cataldo, Anthony. 'Recession-Weary Chip Makers Turn to Auto Apps.' EE Times, May 19, 2003, San Mateo, CA.

Fuel Cells: The Next Technology Revolution. The Silicon Valley, Jul. 30, 2003.

Hamilton, Anita. 'Driving Into the Future.' Time, Jun. 2, 2003, p. 48-50.

Ross, Philip. 'Top 10 Techno-Cool Cars.' IEEE Spectrum, Feb. 2003, p. 30-35.

Ricci, Larry. 'Designing for Telematics Application.' Information Quarterly, vol. 1, Nov. 1, 2002, pp. 25-28.

Letendre, et al. 'The V2G Concept: A New Model for Power?' Public Utilities Fortnightly, Feb. 15, 2002.

Nauman, Matt. 'Fuel-Cell Caravan Future Bound.' Silicon Valley. www.siliconvalley.com, May 23, 2003.

Fortt, Jon. 'Fuel-cell Start-ups Hoping for Breakthrough.' Silicon Valley. www.siliconvalley.com, Jun. 9, 2003.

Bally Hooded Hydrogen Fuel Cells May Have Environmental Drawback, www.siliconvalley.com, Jun. 12, 2003.

Rogers, Paul. 'Electric Car Rules Dropped,' Mercury News, Apr. 25, 2003.

Jollie, David. "Fuel Cells: A Perspective on 2002," Fuel Cell Today, Dec. 18, 2002.

Johnson, R. Colin. 'Michigan Gears Up Solar Car Design.' EE Times, May 23, 2003, Ann Arbor, MI.

Crenson, Matt. 'Not Your Father's Tank of Gas: Can a Hydrogen-Powered Future Solve America's Energy Woes?' SF Chronicle, Jun. 29, 2003.

Module 2: Hydrogen Use. Hydrogen Fuel Cell Engines and Related Technologies: Rev 0, Dec. 2001.

Fuel Cells in Transportation, Fuel Cells 2000, The Online Fuel Cell Information Center [online], May 2002 [retrieved on Sep. 1, 2009]. Retrieved from the Internet: <URL: http://web.archive.org/web/20020528003255/http://www.fuelcells.org/>.

ChevronTexaco, Energy Conversion Devices Take a Breather from Fuel Cell Development. Hybrid & Electric, vol. 25, No. 11, Jun. 1, 2003.

Roessger, Peter. 'An International Comparison of the Usability of Driver-Information-Systems: Tools, Results, and Implications.' SAE International, FTTC, Jun. 23-25, 2003.

Nelson, et al. 'Modeling the Performance of 47 Lithium-Ion Batteries for Fuel Cell Vehicles.' Future Transportation Technology Confonference, Jun. 23-25, 2003.

Bekiarov, et al. 'Design and Implementation of a Mobile Single-Phase AC Pwr Supply for Land Vehicles with 28V1200V Dual Voltage Altenators,' FTTC, Jun. 23-25, 2003.

Lukic, et al. 'Effects of Electrical Loads on 42V Automotive Power Systems,' Future Transportation Technology Conference, Jun. 23-25, 2003.

Rajashekara, et al. 'New On-Board Power Generation Technologies for Automotive Auxiliary Power Units,' Future Transportation Technology Confonference, Jun. 23-25, 2003.

Moghbelli, M. 'A Comparative Review of Fuel Cell Vehicles & Hybrid Electric Vehicles, Part II: Control Strategies, Power Train, TC, I, ND, and M & C,' FTTC, Jun. 23-25, 2003.

Hydrogen Cars Not Needed, U.S. Experts Say, Reuters, Jul. 18, 2003.

Browning, Louis. 'Projected Automotive Fuel Cell Use in California.' Oct. 2001, 38 pages.

Weber, Thomas. 'The Car of Tomorrow.' High Tech Report, Feb. 2003. 22 pages.

Delphi Corporation, "Delphi Solid Oxide Fuel Cell Auxilliary Power Unit," Product Release, Jun. 2004, 2 pages.

Helgren, J.M., et al. "Design and Development of the University of Wisconsin's Parallel Hybrid-Electric Sport Utility Vehicle", SAE Transactions, vol. 12, No. 3 (Mar. 2003), pp. 1615-1631.

Lipman, T., and Hwang, R. 'Hybrid Electric and Fuel Cell Vehicle Technological Innovation: Hybrid and Zero-Emission Vehicle Technology Links'. Proceedings of the 20th International Electric Vehicle Symposium and Exposition, Long Beach, CA [online], Nov. 2003 [retrieved on Apr. 9, 2009], Retrieved from the Internet:<URL: http://hydrogen.its.ucdavis.edu/publications/publications2003.html/resolveuid/860779aed6db7fb422ec0ec40f7dba75>.

Okamura, M. et al. "Development of Hybrid Electric Drive System Using a Boost Converter." In: Proceedings of the 20th International Electric Vehicle Symposium and Exposition (EVS-20) (Long Beach, CA, Nov. 15-19, 2003). Toyota Motor Corporation.

Hermance, Dave. "New Efficiency Baseline 2004 Toyota Prius." EPRI Hybrid Electric Vehicle Working Group, Toyota Technical Center, USA, Nov. 15, 2003.

Toyota. Converter (2001 Prius). Engine and Engine Control, Power Source/Network, Toyota 2001 Prius New Car Features (NCF 182U), Apr. 5, 2000 [online], pp. 36 [retrieved on Jul. 1, 2009]. Retrieved from the Internet <URL: https://techinfo.toyota.com/t3Portal/resources/jsp/siviewer/index.jsp?dir=ncf/NCF182U&href=xhtml/NCF182U_0026.html>.

Toyota. Power Source (2001 Prius). System Circuits, Power Source/Network, Toyota 2001 Prius Electrical Wiring Diagram (EWD414U), Apr. 5, 2000 [online], pp. 50-53 [retrieved on Jul. 1, 2009]. Retrieved from the Internet <URL: https://techinfo.toyota.com/t3Portal/resources/jsp/siviewer/index.jsp?dir=ewd/EWD414U&href=xhtml/EWD414U_0047.html>.

Wikipedia. 'Hybrid Synergy Drive' [online], [retrieved on Apr. 20, 2009]. Retrieved from the internet: <URL: http://en.wikipedia.org/wiki/Hybrid_Synergy_Drive>.

Wikipedia, 'Toyota Prius' [online], [retrieved Apr. 23, 2009]. Retrieved from the internet: <URL: http://en.wikipedia.org/wiki/Toyota_Prius>.

42 Volts: The New Energy Standard. Delphi Automotive Systems—Energy and Engine Management Systems [online], [retrieved on Sep. 3, 2009]. Retrieved from the Internet: <URL: http://transportation.centennialcollege.ca/gwright/Electrical%20Files/42-volt.pdf>.

Bentley, J. & Derby R. 'Ethanol & Fuel Cells: Converging Paths of Opportunity,' Renewable Fuels Association [online], July 2002, [retrieved on Sep. 1, 2009]. Retrieved from the Internet: <URL: http://www.ethanolrfa.org/objects/documents/129/rfa_fuel_cell_white_paper.pdf>.

Kessels, J. T. B. A., 'Energy Management for Automotive Power Nets.' Eindhoven: Technische Universiteit Eindhoven, doctoral thesis [online], Feb. 2007 [retrieved on Apr. 9, 2009]. Retrieved from the Internet: <URL: http://alexandria.tue.nl/extra2/200612535.pdf>. ISBN 90-386-1963-4.

Knowling, M. 'The Toyota Prius Hybrid—Part 1: Driving Toyota's Ingenious Prius . . . ' [online], Jul. 2002 [retrieved on Apr. 20, 2009]. Retrieved from the internet: <URL: http://www.autospeed.com.au/cms/A_1441/article.html>.

Knowling, M. 'The Toyota Prius Hybrid—Part 2: A Technical background of Toyota Australia's Hybrid Vehicle—The Prius . . . ' [online], Jul. 2002 [retrieved on Apr. 20, 2009]. Retrieved from the internet: <URL: http://www.autospeed.com/cms/A_1450/article.html>.

SAE International. "Toyota Prius: Best Engineered car in 2001." Automotive Engineering International Online [online], Mar. 2001 [retrieved on Apr. 20, 2009]. Retrieved from the Internet: <URL: http://www.sae.org/automag/features/prius/prius2.htm>.

Miller, L. "Smart cars, smart roads can help out dumb drivers." SFGate.com [online], [retrieved on Jun. 24, 2003]. Retrieved from the Internet: <URL: http://www.sfgate.com/cgi-bin/article.cgi?file=/news/archive/2003/06/24/national1742EDT0681.DTL>.

Johnson, R. Colin. 'Lab Claims World's Best Mems Sensor.' EETimes, <published on Jun. 12, 2003, 9:47am]. Retrieved from the Internet <URL:www.eetimes.com/story/OEG20030612S0020>.

Huang, Gregory T. 'Monitoring Mom.' Technology Review, published Jul. 2003. Retrieved from the internet <URL:http://www.technologyreview.com/computing/13237/>.

Sequest, Richard. 'Fuel Cell potential in the United States Boating Market.' Fuel Cell Today, published on Jul. 1, 2003. Retrieved from the Internet <URL: http://www.fuelcelltoday.com/events/archive/2003-07/Fuel-Cell-Potential-in-the-Unite>.

USPTO, Board of Patent Appeals and Interferences, Appeal Decision mailed Oct. 31, 2007 for U.S. Appl. No. 10/626,877, issued as 7,353,897, on Apr. 8, 2008.

* cited by examiner

700

TELEMATIC METHOD AND APPARATUS WITH INTEGRATED POWER SOURCE

CROSS-REFERENCE TO RELATED APPLICATION

This application is a divisional of U.S. patent application Ser. No. 12/237,977 filed on Sep. 25, 2008 issued on Nov. 24, 2009 with U.S. Pat. No. 7,621,361, which is a continuation of Ser. No. 11/288,724 filed on Nov. 28, 2005, now U.S. Pat. No. 7,374,003 issued on May 20, 2008, which is a continuation application of Ser. No. 10/626,877 filed on Jul. 23, 2003, now corresponding to U.S. Pat. No. 7,353,897 issued on Apr. 8, 2008.

BACKGROUND

1. Field of Invention

Invention relates to telematic devices and processing method integrated adaptively with a power source and sensors, particularly in fuel cell vehicle applications.

2. Related Art

Conventional power systems in vehicles such as automobiles rely on mechanical energy as primary power sources for vehicle systems. These systems include the growing number of telematic applications in vehicles including Internet, digital video broadcast entertainment, digital audio broadcast, digital multimedia broadcast, global positioning system navigation, safety services, intelligent transportation systems, and universal mobile telecommunications system.

The advent of fuel cell technology has initiated the genesis of a change in standard from the combustion engine in vehicles to vehicle engines powered by fuel cells. Similarly, a new industry standard has emerged that calls for a 42-volt electrical vehicle system as opposed to the conventional 12 to 14 volt electrical system. This transformation is due to higher electrical loads that vehicles face as a result in higher demands of hotel loads such as onboard computing navigation, electronically heated seats, video entertainment systems, and other telematic devices, along with the traditional electrical requirements for the body/powertrain control branch of the vehicle that includes throttle actuation, steering, active suspension and ride height adjustment, electric air conditioning, and electrically heated catalyst.

Unlike conventional vehicles with internal combustion engines that use mechanical energy as a primary source of power, fuel cell vehicles require greater on-board electric power to run the traction motor and increasing number of telematics in addition to the standard body/powertrain control components. Accordingly, there is need for an integrated telematic system in fuel cell vehicles that derive the necessary power requirement from on-board electric power sufficient to for electric requirements.

SUMMARY

Telematic apparatus with integrated power source in a vehicle utilizes a fuel cell as a primary source of power for the traction motor. The vehicle includes an integrated network comprising a power system, an electrical system, a telematic system, and a body/power train control system. These integrated systems are adaptively controlled by one or more microprocessors run by programmable software functions that allow a user to operate the vehicle using telematics and multimedia networks.

Central controller is a core element of this electro-mechanical vehicle scheme, and distributes and manages electricity preferably in a 42-volt system. The controller serves as a multimedia center for the user to control both electronic and mechanical segments of the vehicle through a gateway. Its main task is to control the user interaction with the system and serve as a front-end for many electronic control units. These units include telematic components in the vehicle such as wireless internet, digital video broadcast entertainment, digital audio broadcast, digital multimedia broadcast, global positioning system navigation, safety services, intelligent transportation systems, and universal mobile telecommunications system.

In order to communicate with the electronic control units, the central controller has access to one or more buses through a gateway controller, which acts as a router, switch or other selectable signal interconnect between various electrical buses in the vehicle. The control area network and local interconnect network protocol enable communication between electronic control units in the vehicle systems. The telematic systems use a media oriented systems transport, intelligent transportation system data bus and universal serial buses to connect to the gateway.

DETAILED DESCRIPTION

Figure 1:
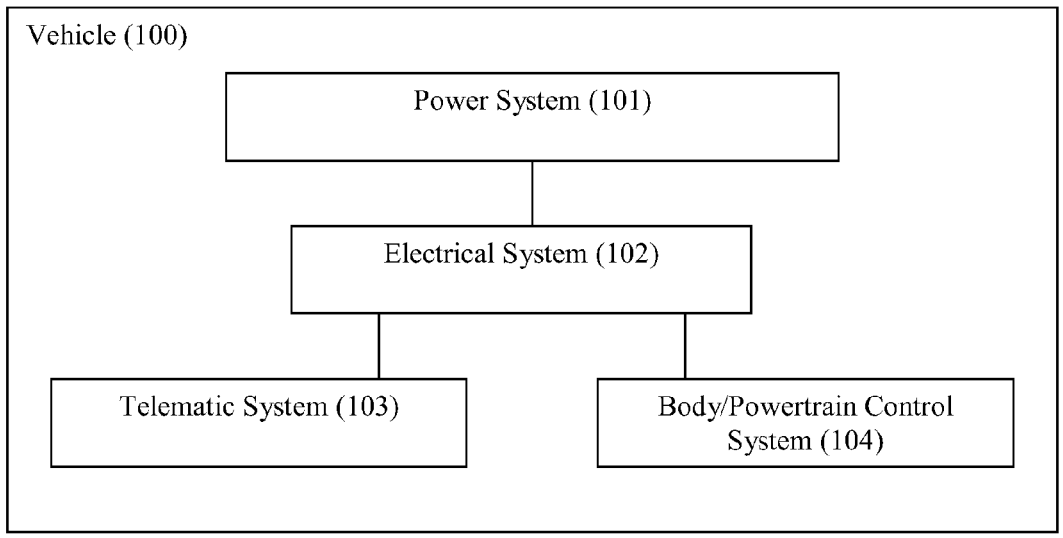
FIG. 1 is a simplified system diagram showing vehicle subsystems according to an embodiment of the present invention.

FIG. 1 shows a generalized embodiment of a vehicle (100) including main systems comprising a power system (101), an electrical system (102), a telematic system (103), and a body/powertrain control system (104) integrated within the vehicle (100). Different embodiments can include alternative vehicle configurations. For example, an embodiment may include the body/powertrain control system (104) deriving mechanical energy directly from the power system (101) via work done by the combustion engine, such as in a conventional automobile. A vehicle (100) is defined broadly to include automobiles, trucks, vans, motorcycles, tractor-trailers, haulers, ambulances, fire engines, police cars, taxis, buses, and similar fleet vehicles, heavy equipment machinery such as backhoes, forklifts, and bulldozers, and can include other devices that in or on which any person or thing may be carried and transported including boats, vessels, ships, carriers, barges, submarines, aircraft, helicopters, and space craft.

Figure 2A:
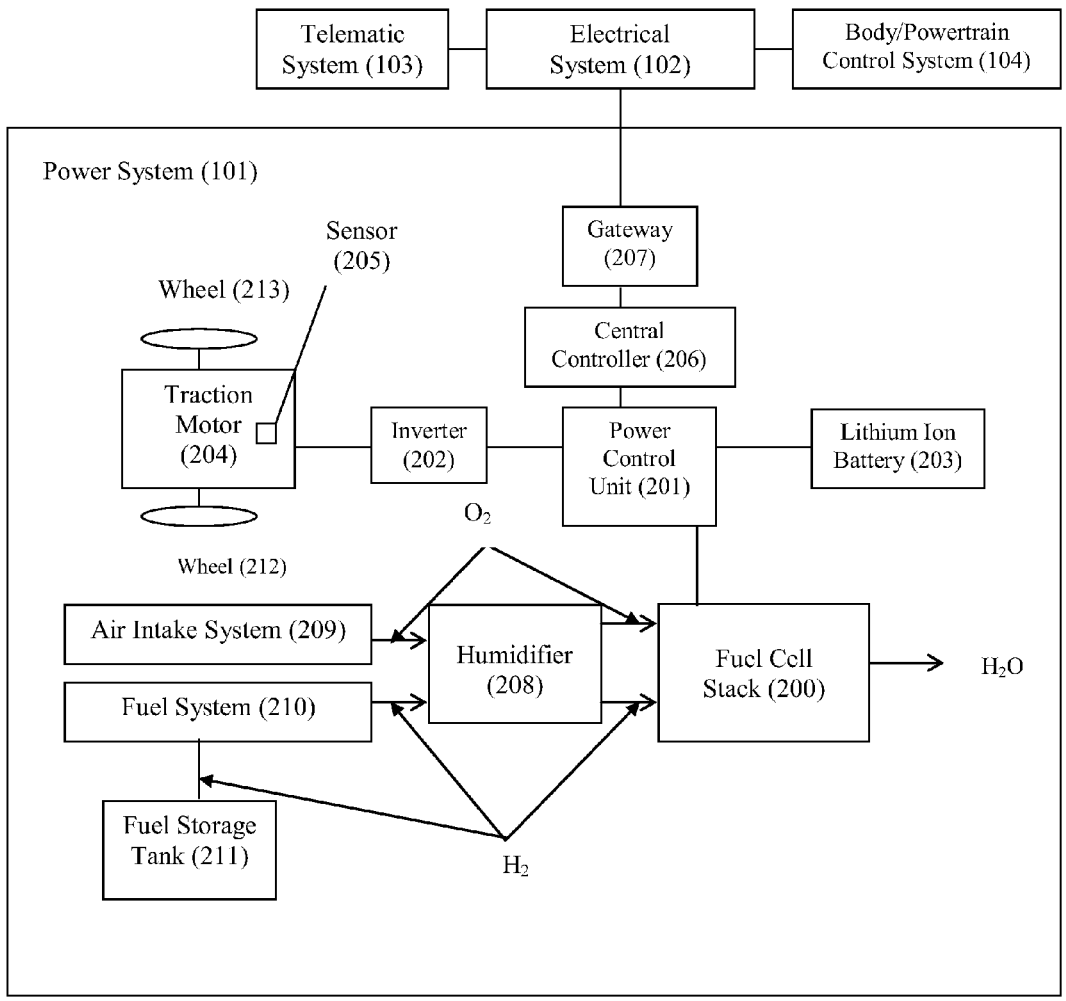
FIG. 2a is functional diagram illustrating the vehicle power system according to an embodiment of the present invention.
Figure 2B:
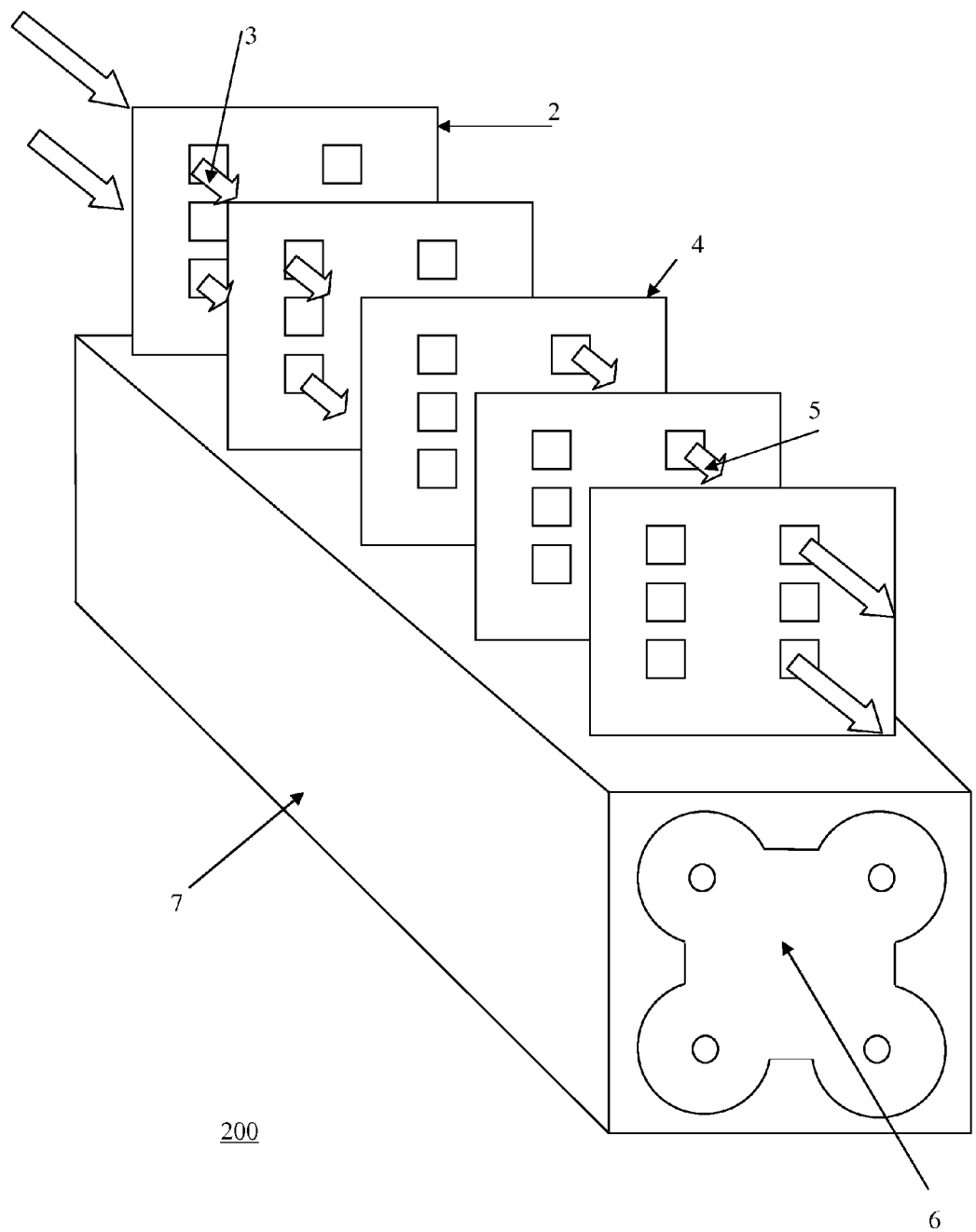
FIG. 2b is a diagram illustrating a fuel cell stack according to an embodiment of the present invention.
Figure 2C:
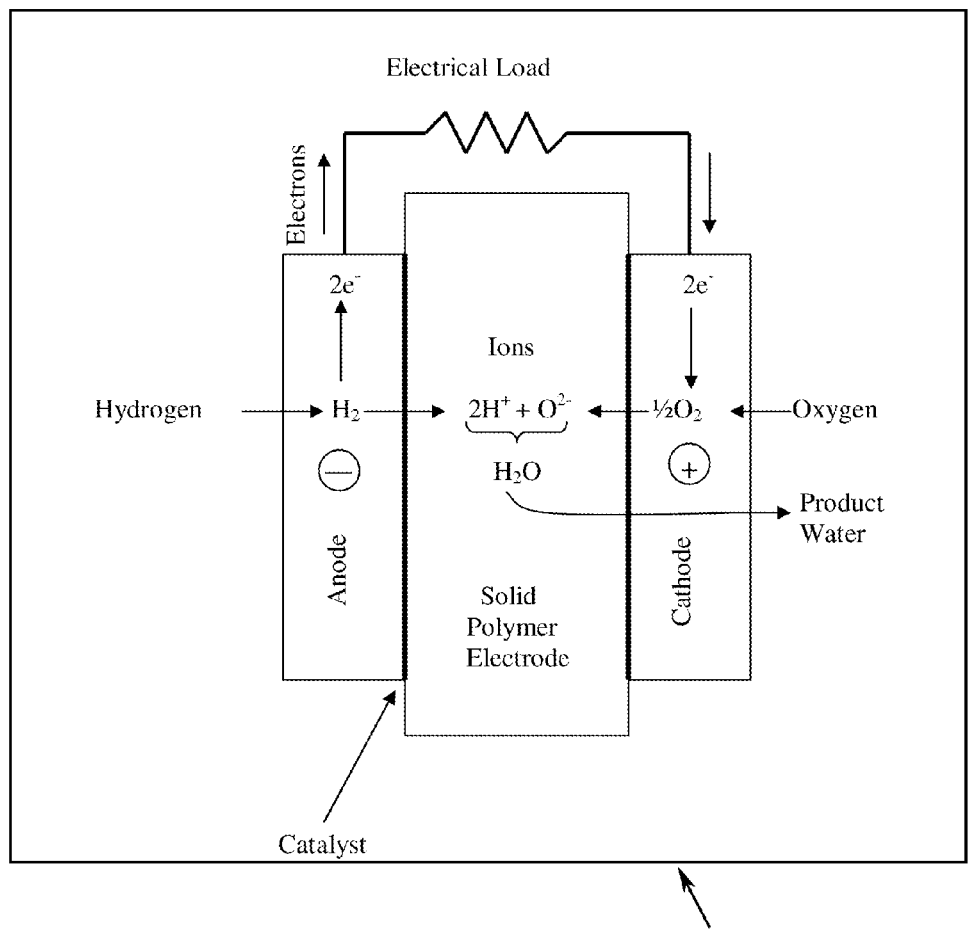
FIG. 2c is a diagram illustrating a proton exchange membrane fuel cell according to an embodiment of the present invention.

FIG. 2a shows power system (101), which preferably is source of energy for the traction motor (204). The fuel cell stack (200) as shown in FIG. 2b serves as the power source. The fuel cell stack (200) is an alternative to conventional combustion as primary source of power for the traction motor. A fuel cell stack (200), however, can be used in conjunction with a combustion engine and can serve as a secondary or auxiliary power source for the traction motor (204) or as a main power source for other components in the vehicle in want of electric energy. For example, the combustion engine may turn the traction motor (204) while the fuel cell stack (200) may power the components in the telematic system (103) and/or the body/powertrain control system (104) components. The fuel cell stack (200) is comprised of multiple Proton Exchange Membrane (PEM) fuel cells (214) using solid polymer electrolyte as shown in FIG. 2c. The number of fuel cells (214) in the fuel cell stack (200) determines the amount of electricity that the fuel cell stack (200) can provide to the vehicle (100), to the telematic system (103), and to the body/powertrain control system (104). A large number of fuel cells (214) in the fuel cell stack (200) produces more electricity than a fuel cell stack (200) with fewer fuel cells (214).

As shown representative fuel cell stack (200) shows expanded single fuel cell (7) including membrane electrode assembly and two flow field plates; this assembly uses flow field plate (2) such that hydrogen and air gases are supplied to the electrodes through channels formed in flow field plates. Hence hydrogen (3) flows through channels in the flow field plates to anode where platinum catalyst promotes separation into protons and electrons. Membrane electrode assembly (4) includes anode and cathode electrodes with thin layer of catalyst, bonded to either side of PEM fuel cell. Air (5) flows through channels in the flow field plates to the cathode, and oxygen in the air attracts hydrogen protons through PEM fuel cell. Also air stream removes water created as byproduct of electrochemical process. In a completed fuel cell stack (6), single fuel cells are combined into a fuel cell stack to produce desired level of electrical power.

Figure 2D:
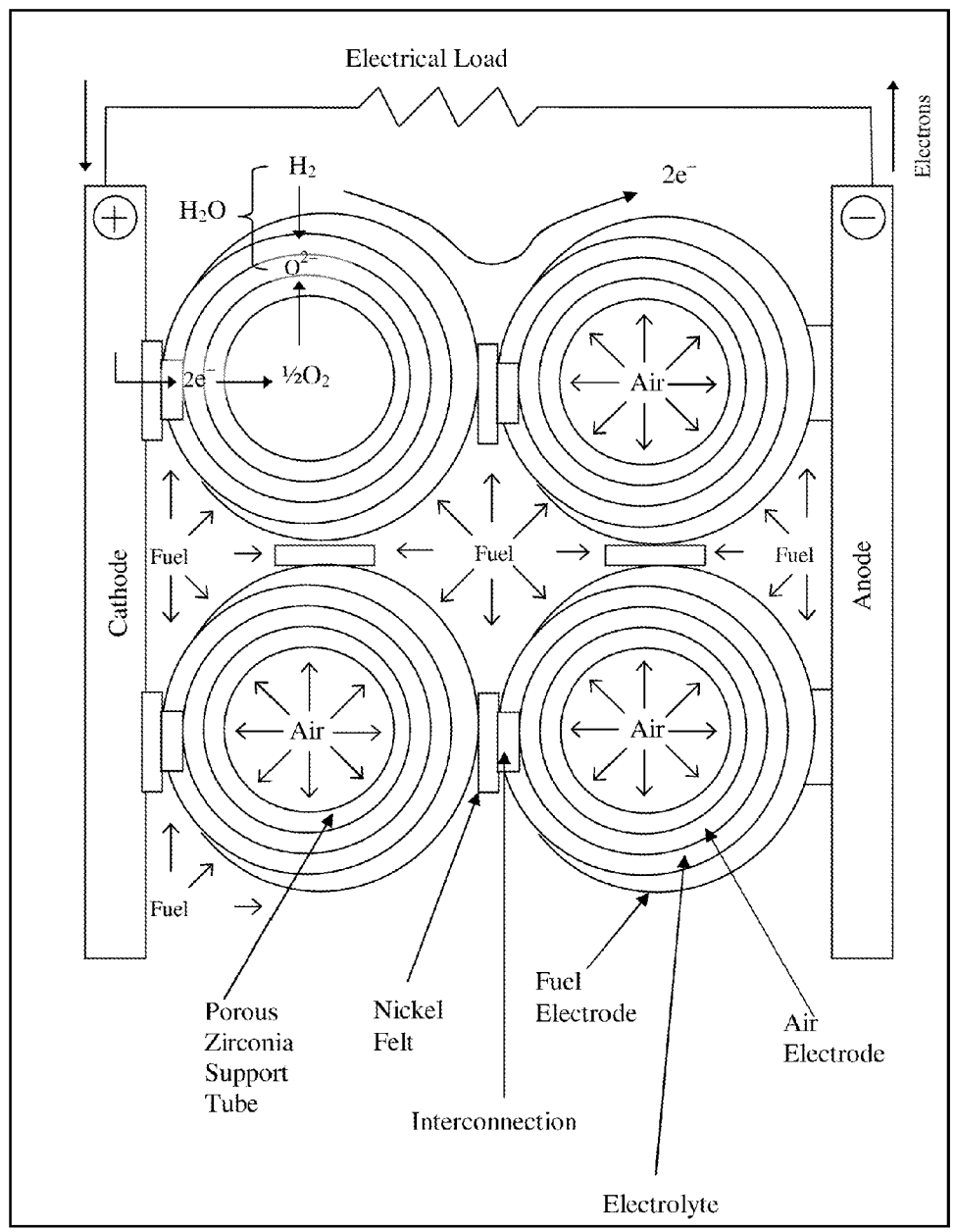
FIG. 2d is a functional diagram illustrating tubular-design solid oxide fuel cell according to an embodiment of the present invention.
Figure 2E:
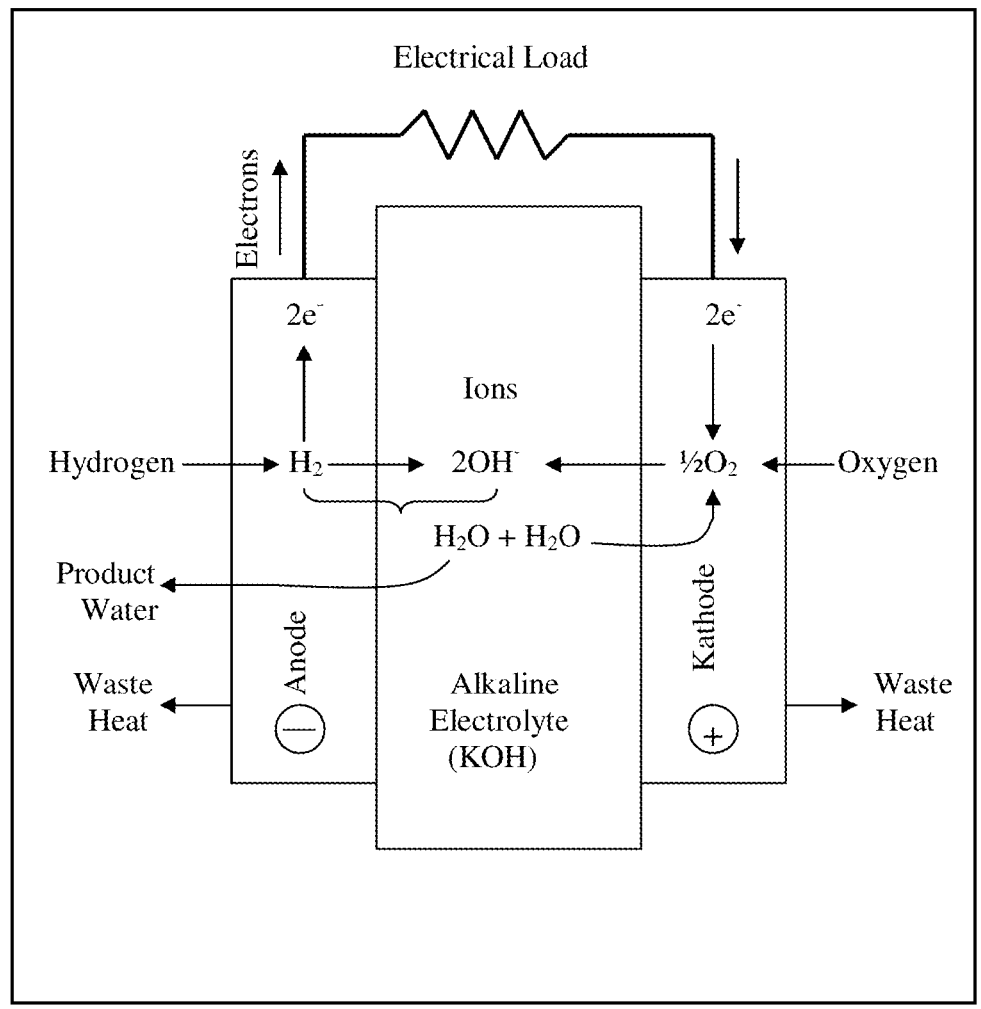
FIG. 2e is a functional diagram illustrating alkaline fuel cell according to an embodiment of the present invention.
Figure 2F:
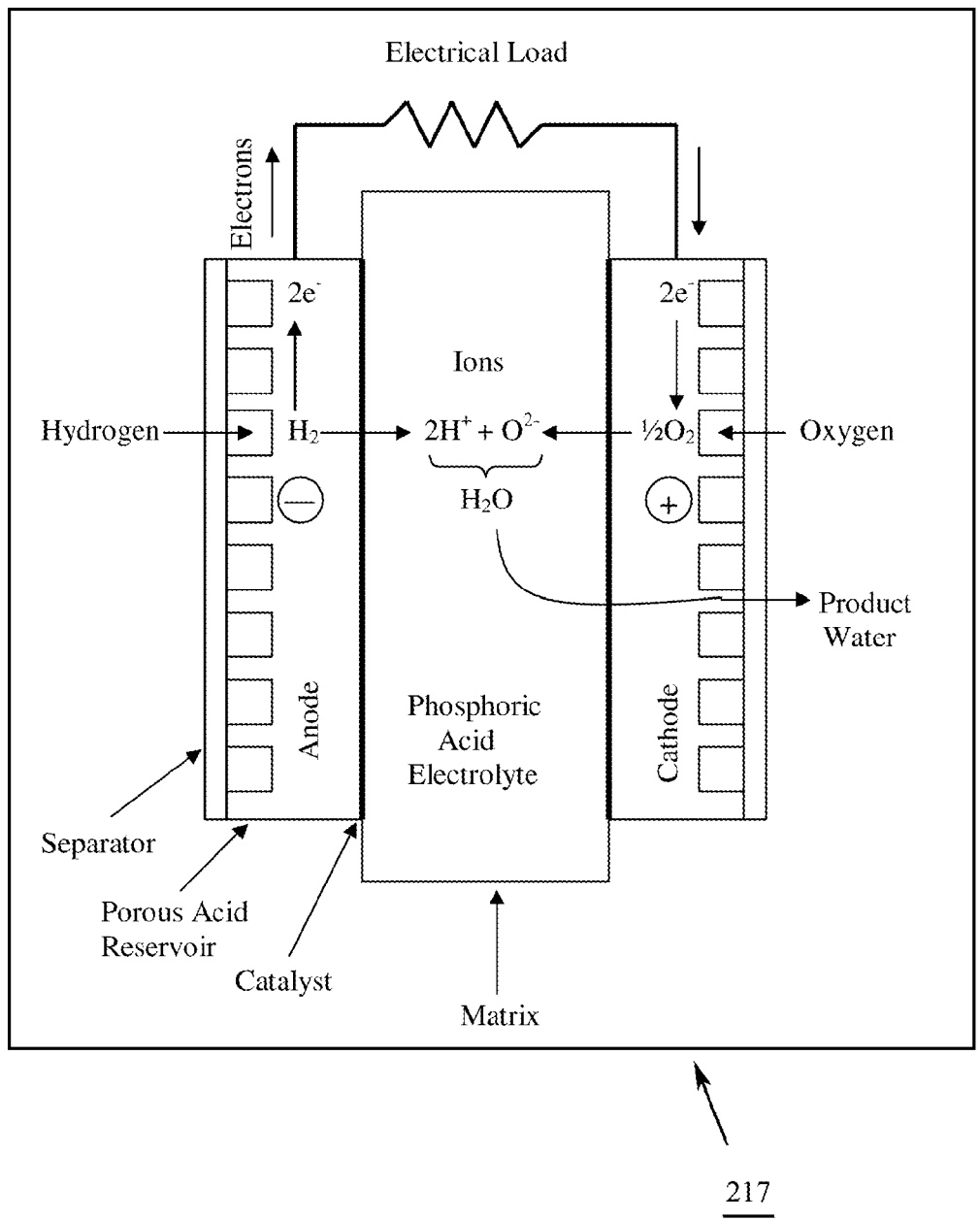
FIG. 2f is a functional diagram illustrating phosphoric acid fuel cell according to an embodiment of the present invention.
Figure 2G:
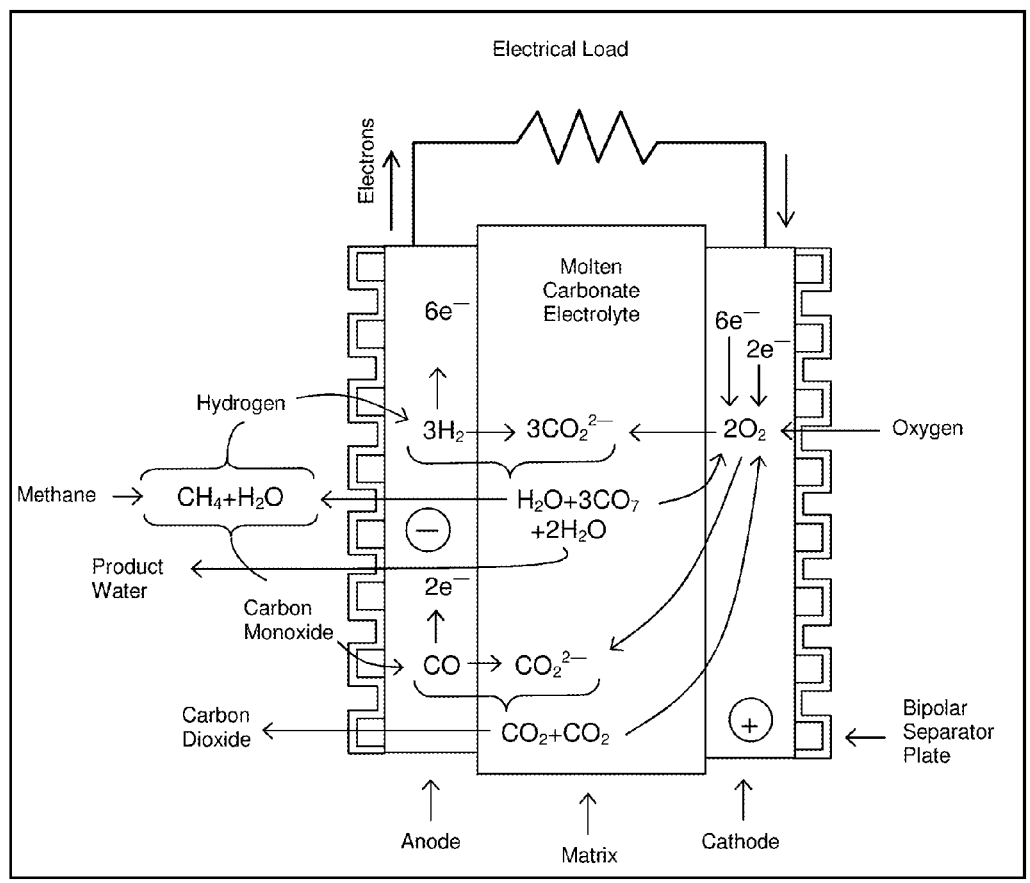
FIG. 2g is a functional diagram illustrating molten carbonate fuel cell according to an embodiment of the present invention.

PEM fuel cells (214) are included in fuel cell stack (200) in one embodiment of this invention. Alternatively, other types of fuel cells can be used in the fuel cell stack (200) instead of the PEM fuel cell (214). For example, a solid oxide fuel cell (SOFC) as shown in a porous zirconia and nickel tubular design (215) in FIG. 2d, an alkaline electrolyte fuel cell (216) as shown in FIG. 2e, a molten carbonate fuel cell (218) as shown in FIG. 2g, or a phosphoric acid electrolyte fuel cell (217) as shown in FIG. 2f can be used as substitute fuel cells in the fuel cell stack (200) in the power system (101) of the vehicle (100).

The fuel cell stack (200) creates electricity by combining air ($O_2$) and hydrogen ($H_2$). The $O_2$ is filtered through the vehicle (100) air intake system (209) and travels to the humidifier (208) and then to the fuel cell stack (200). The hydrogen fuel ($H_2$) is stored in the fuel storage tank (211). The fuel storage tank (211) feeds the $H_2$ through the fuel system (210) to the humidifier (208) and then to the fuel cell stack (200) where it combines with the $O_2$ and forms water ($H_2O$) which can be used for cooling components of the vehicle (100) system and/or is emitted as the vehicle (100) exhaust. Optionally, a fuel system (210) can include an on-board reformer when pure hydrogen is not available as fuel for the fuel cell stack (200). The reformer can derive the hydrogen from other forms of natural gas.

The fuel cell stack (200) generates electricity that is sent to the power control unit (201). The power control unit (201) controls precisely the distribution of electric power of the fuel cell stack (200) and the lithium-ion battery (203). The lithium-ion battery (203) assists the output of the fuel cell at ignition and during acceleration and stores the regenerative power, such as created from heat during braking. Optionally, the lithium-ion battery (203) can be used as a rechargeable device, receiving charge from braking or also from electricity generated directly from the fuel cell stack (200). The lithium-ion battery can also assist with electrical requirements demanded by applications in the telematic system (103) and in the body/powertrain control system (104). For example, a vehicle containing a 12-14-volt electrical system as opposed to a 42-volt electrical system may require additional electric power due to numerous add-on or post-sale telematic applications.

Electricity distributed from the power control unit (201) passes through the inverter (202) to the traction motor (204). The traction motor turns the wheels (212, 213) of the vehicle. Alternatively, a sensor (205) in the traction motor (204) can detect the speed of the vehicle by measuring the rotations of the motor shaft turned by the traction motor (204). The sensor (205) in the embodiment of this invention can either be an optical sensor, a magnetic sensor, or an isolated optical sensor. For example, a slotted wheel on the motor shaft alternately blocks and unblocks the light path between the LED and the phototransistor in the slotted switch as the motor shaft rotates. Alternatively, a reflective optical sensor can be used for the same function.

The sensor (205) in the traction motor (204) may be susceptible to motor oil exposure, reducing the ability of the sensor to detect rotation because of excessive interrupts. Additional hardware or software (302) can be added to detect unusual conditions. For example, the software (302) can have a timer that tracks the time between the excessive interrupts detected by the reflective sensor (205). When the sensor interrupt service routine is exited and immediately reentered by the software (302), the interrupt service routine could disable the interrupt and set a flag to notify the system or the user of the error.

Different embodiments of the power system (101) can include alternative power configurations. For example, an internal combustion engine, as opposed to a fuel cell stack (200), may be used in the power system (101) as the driving force for the traction motor (204). In this case, the body/powertrain control system (104) is run primarily from mechanical energy directly from the power system (101) as opposed to electric energy from the electrical system (102) as currently shown in FIGS. 1 and 2a.

The power control unit (201) is also connected to the central controller (206), which is the core element of the vehicle (100), in that the power control unit (201) serves as the multimedia center for the user to control the power system (101), and the electrical system (102), the telematic system (103) and the body/powertrain control system (104) via the gateway (207). The main tasks of the central controller (206) are to control the user interaction with the power system (101), and the electrical system (102), the telematic system (103) and the body/powertrain control system (104), and serve as a front-end for the telematic applications in the vehicle (100).

Figure 3:
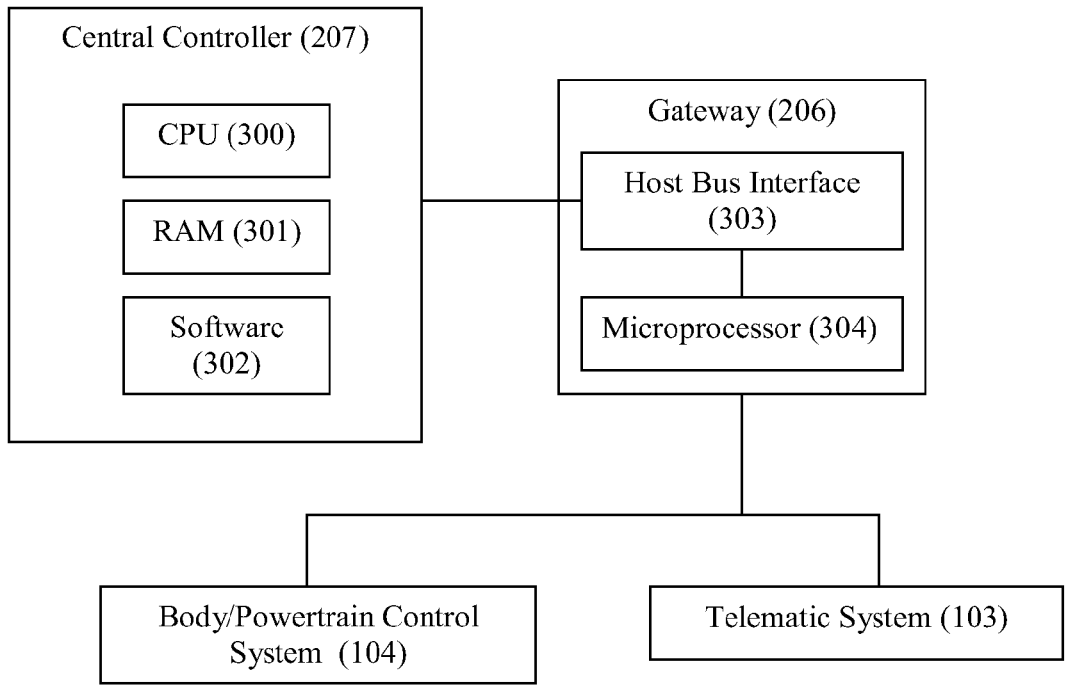
FIG. 3 is a block diagram illustrating interaction between the gateway and the vehicle central controller according to an embodiment of the present invention.

FIG. 3 shows functional interaction between the central controller (206) and the gateway (207). FIG. 3 represents one configuration in which the central controller (206) and the gateway (207) interact. The central controller (206) accesses the power system (101), and the electrical system (102), the telematic system (103) and the body/powertrain control system (104) through the gateway (206). The gateway (207) is a programmable signal interconnect, router, or switch between the electrical system (102), the telematic system (103) and the body/powertrain control system (104) and integrates the vehicle multimedia interfaces discussed below. The central processing unit (CPU) (300) with associated processor runs the software (302) for the vehicle (100). RAM (301) stores the software functions for execution by the microprocessor (304) to enable informational alerts to the user and user response commands. For example, GPS navigation (601) information that guides the user along a specific route in a GPS map is stored in the RAM (301). The memory keeps track of the vehicle position on the map as the user guides the vehicle along the route. Optionally, the memory can store user input each time the vehicle turns onto a new street in the route.

Additionally, the memory in the RAM (301) stores user preferences in the vehicle (100) related to seat adjustment, steering wheel protrusion, and air conditioning or heater temperature. Additionally, the memory can be used to store security alerts, such as an open door, or disengaged seatbelt, and wait for user response as to a solution. RAM (301) can be installed as standard equipment, or alternatively can be replaced with add-on RAM if the user decides to install additional software to support extra telematic features and/or devices.

Figure 5:
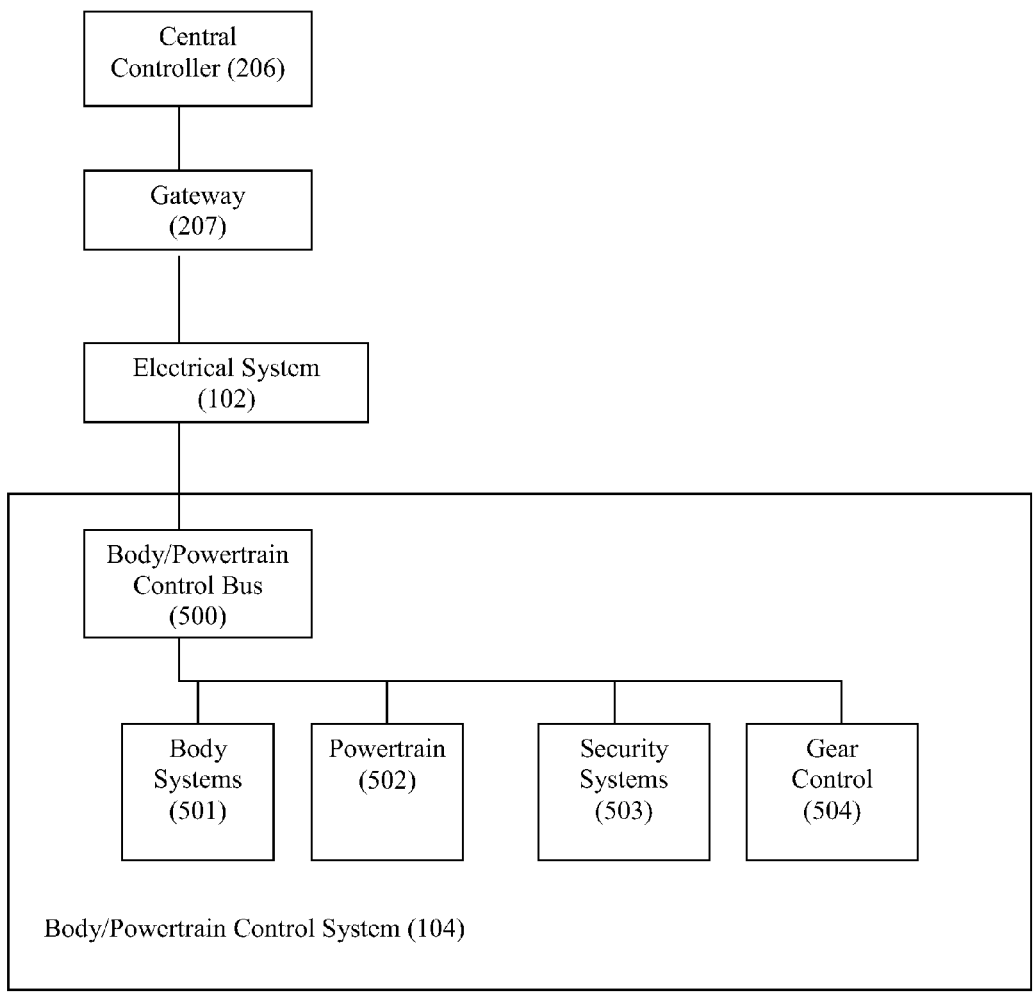
FIG. 5 is a block diagram illustrating the vehicle body/powertrain control subsystem according to an embodiment of the present invention.

The central controller (206) connects to the gateway (207) via the host bus interface (303). One or more microprocessors (304) assist the gateway (207) in performing the software (302) functions required by the power system (101), and the electrical system (102), the telematic system (103) and the body/powertrain control system (104) as shown in FIG. 5. Optical isolator sensors can be employed in the microprocessor (304) to pass signals between circuits. The software (302) can be included as standard equipment in the central controller (206), or alternatively, additional software can be used to upgrade the central controller (206) for add-on telematic features implemented by the user. The software can be programmable to allow a flexible telematic system (103) design as well as to program the system specific to user needs. Programmable software can provide upgradeable interfacing on a large or small scale within the interfacing buses or as a complete bus-interfacing unit. It can allow interfacing between various protocols used by different application-specific standard products.

Software (302) and associated databases may be installed or partitioned in one or more telematic appliances (103) or other network-accessible device, and executable locally or remotely by one or more controller (206) or other processor provided in telematic appliance (103) or other network accessible device.

Figure 6:
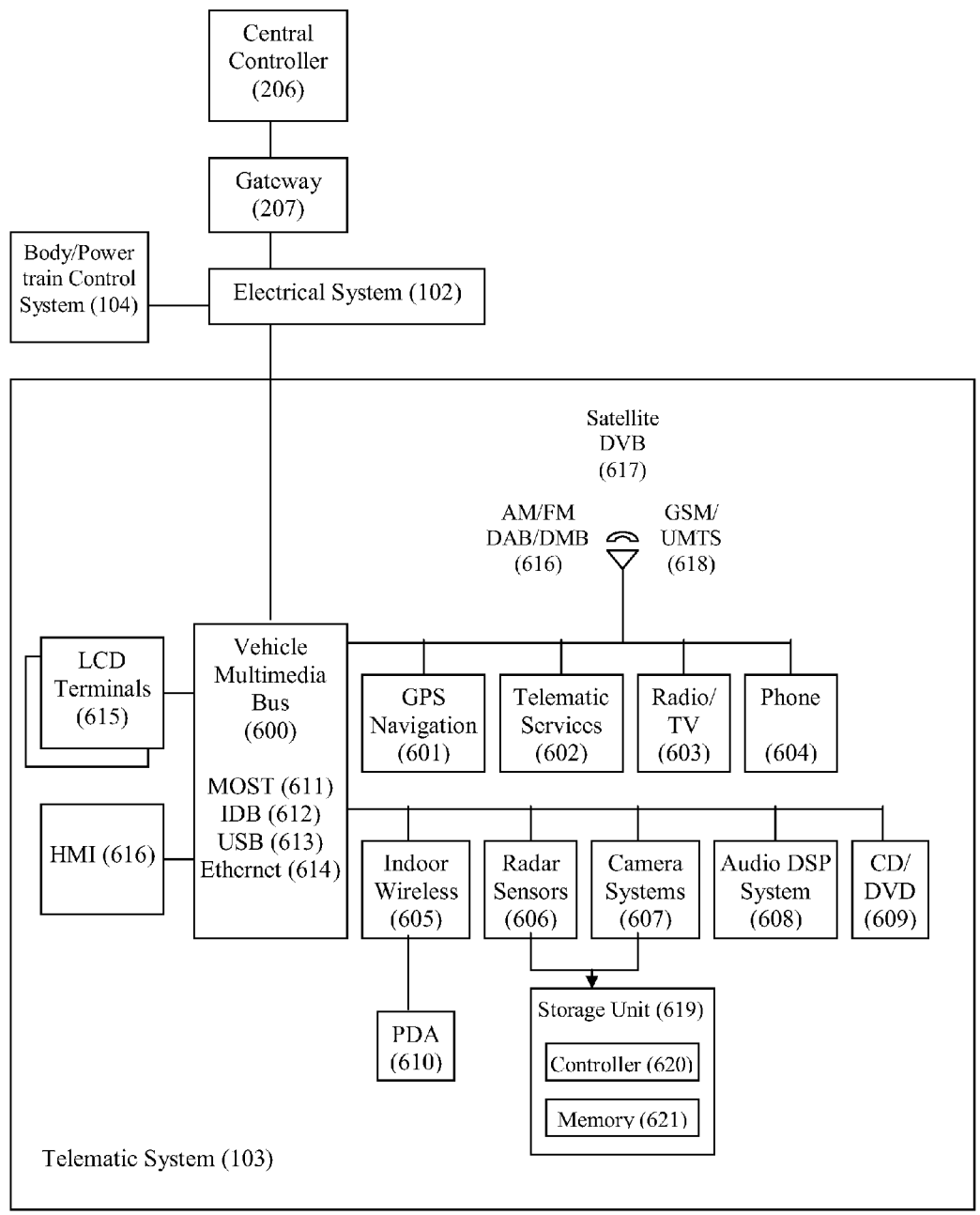
FIG. 6 is a block diagram illustrating the vehicle telematic subsystem according to an embodiment of the present invention.

The gateway (207) can support a variety of interfaces and system buses to support alternative designs, improvements, and upgrades to vehicle systems. The gateway (207) integrates the multimedia interfaces such as the vehicle multimedia bus (600), the media-oriented system transport (MOST) (611), the intelligent transportation system data bus (IDB) (612), and the universal serial bus (USB) (613) as shown in FIG. 6. The gateway (207) is also a router for additional systems and/or buses in a vehicle. The gateway (207) supports various interfaces so the system can communicate with buses used by different manufacturers. Different interfaces for specific bus systems can be chosen. For example, in emergency vehicles, the gateway (207) can integrate an on-board traffic light control system for more efficient travel during emergencies. The gateway (207) may also support additional computer-related communications or wireless interfaces such as Ethernet, WIFI, and Bluetooth.

Figure 4:
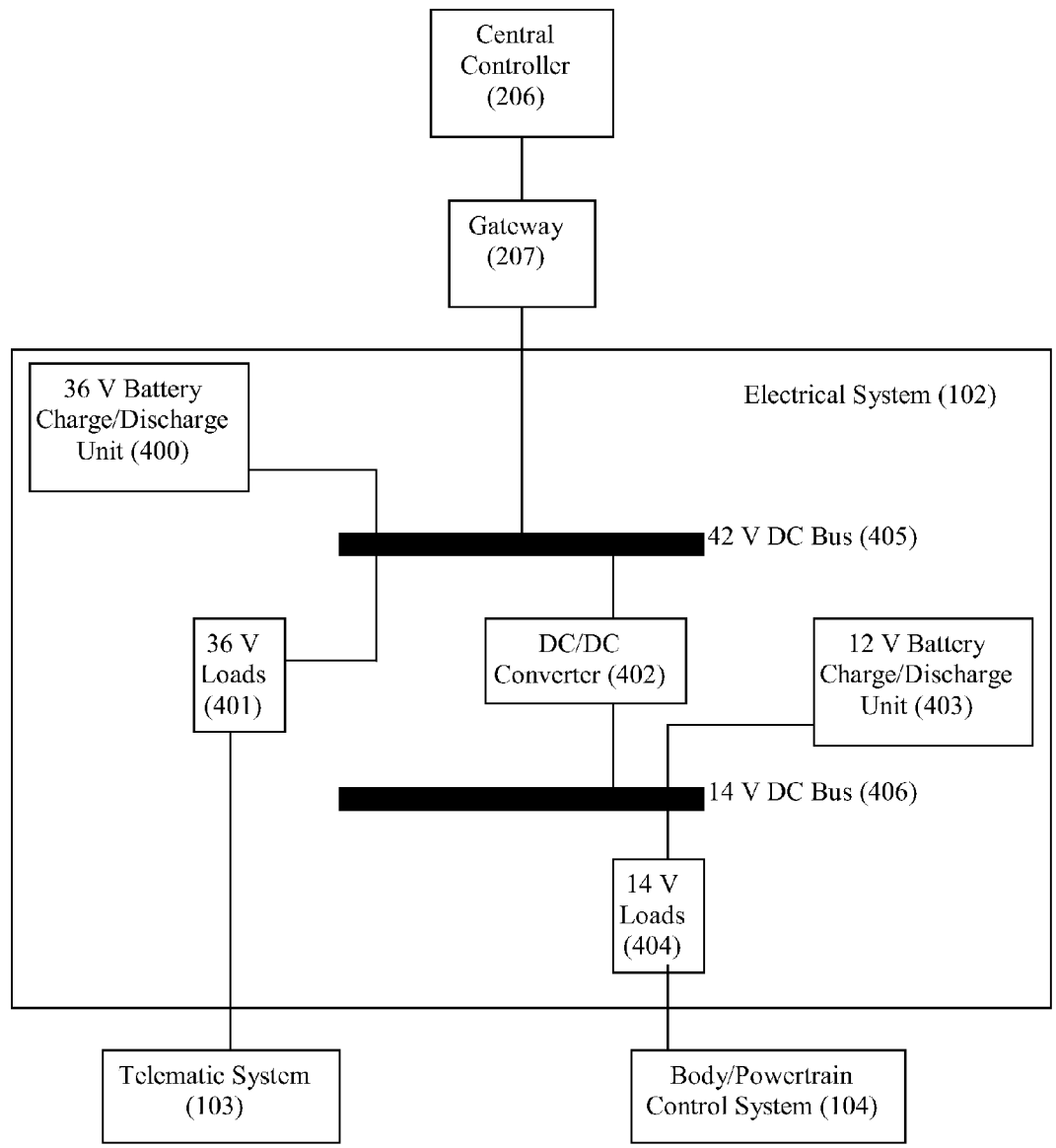
FIG. 4 is a block diagram illustrating the vehicle electrical subsystem according to an embodiment of the present invention.

FIG. 4 shows the electrical system (102). The electrical system (102) includes a 42-volt system that powers the telematic system (103), which requires approximately 36-volt loads (401), and the body/powertrain control system (104), which requires approximately 14-volt loads (404). These system loads can be redistributed in different ratios or quantities throughout the vehicle (100) systems in order to satisfy alternative electric load demands as a result of variations in vehicles and system configurations. For example, an ambulance or fire engine may contain a higher electric load requirement for its telematic devices than would a conventional automobile due to the greater number of such devices, such as medical or water pressure management equipment in these types of vehicles. Alternatively, a vehicle with few telematic devices may have a configuration comprised of the conventional 12-14-volt electrical system.

The 42-volt DC bus (405) supports the 36-volt battery charge/discharge unit (400). Similarly, a 14-volt DC bus (406) supports the 12-volt battery charge/discharge unit (403). A DC/DC converter (402) connects the 42-volt DC bus (405) and the 14-volt DC bus (406). In alternate electrical configurations, the electrical system (102) may include 12-14-volt system supporting the telematic system (103) and the body/powertrain control system (104). In such cases, the number of telematic and body/powertrain applications may be relatively low.

FIG. 5 shows the body/powertrain control system (104) branch of the vehicle (100). Software functions for the body/powertrain control system (104) are provided by the central controller (206) through the gateway (207) to the body/powertrain control bus (500). The body/powertrain control system (104) can support variations of buses depending on the specific requirements of the body/powertrain control system (104). For example, in the present embodiment of the invention, the body/powertrain control bus (500) supports body systems (501), powertrain (502), security systems (503), and gear control (504). Alternative body/powertrain control designs may contain more or less support branches. For instance, the vehicle security systems may be run by applications in the telematic system (103) instead of the body/powertrain control system (104), thus opening an available branch in the body/powertrain control system (104) for high pressure water pumps fire engines, or hydraulic lifts in heavy equipment machinery.

The body systems (501) include vehicle (100) components such as automatic door locks, power windows, interior lights, exterior lights, turn signals, windshield wipers, heater, electronic air conditioning, electronically heated seats, airbag deployment, and defrost mechanisms. The body systems (501) can have various applications depending on the type of vehicle to which they apply. For example, tractor-trailers can have alternative or modular body systems requirements due to a different functionality than a passenger vehicle.

The powertrain (502) branch allows user control with the transmission, the driveline, traction motor (204), throttle actuation, steering, active suspension and ride height adjustment. Optionally, the body/powertrain control system (104) can allow the user to control the transmission directly, such as for manual transmissions, depending on diver preference. Security systems (503) include applications including voice recognition, solid-state finger print scanners, theft alerts, and door lock sensors. The security system (503) can also alert the user of malfunctions within the vehicle (100) systems. For example, the security system can detect a failed LED in sensors that compromise vehicle safety or security. For instance, a comparator senses the voltage at the LED anode. When the LED is on, the voltage drop is approximately 1.2 volts, and the comparator output is high. If the LED opens, the voltage at the anode will rise to above 3 volts. In this instance, the LED is operating constantly. For switched LED that may occasionally be turned off, the voltage drop across the switching transistor is considered with the reference voltage, and the software (302) ignores the comparator output when the LED is turned off.

Although a disconnected LED is much more likely than a shorted LED, a second comparator may be added to detect the shorted condition. The reference voltage may be around 0.6V, and the software may declare an error if the voltage drops below the reference.

Gear control (504) allows for immediate shift from software driven automatic transmission to manual-on-demand transmission during vehicle operation at the request of the driver. Other gear control applications include equipment appendages on heavy-equipment fleet vehicles such as shovels, rollers, buckets, booms, ladders, hoes, and drills.

FIG. 6 shows the telematic system (103) branch of the vehicle (100). The central controller (206) communicates to the telematic system (103) at the vehicle multimedia bus (600), via the gateway (207) and the electrical system (102). Communication is enabled through media oriented system transport (MOST) (611). Optionally, communication can be made through intelligent transportation systems data bus (IDB) (612), universal serial bus (USB) (613), and Ethernet (614). The local interconnect network protocol from the central controller (206) can carry the communication to the telematic system (103), as well as between the between the power system (101), the electrical system (102), and the body/powertrain control system (104), by combining multiple sensors to satisfy the high data rate and enhance communication capability. These sensors, such as sensor (205), can be an optical sensor, a magnetic sensor, or an optical isolator sensor depending on the application; other sensors are described further herein. For example, optical sensors can be used to determine vehicle speed by measuring the rotations of the motor shaft. Magnetic sensors can be implemented in situations requiring user alerts that a door, or valve is open or shut. Optical isolator sensors can be employed in microprocessors (304) to pass signals between circuits.

The vehicle multimedia bus (600) feeds outgoing data to the human-machine interface (HMI) (616) and LCD terminals (615) for efficient display for the user. The human-machine interface (616) provides the mechanisms or devices that receive user input to respond to telematic responses, such as security alerts and navigational information. The mechanisms or devices can be additional LCD screens capable of touch screen command protocol. Optionally, the mechanisms or devices can be button interface wherein the user pushes buttons or turns knobs to input commands to the telematic system (103). The vehicle multimedia bus (600), the human-machine interface (HMI) (616), and LCD terminals (615) integrate together to provide the user access to all of the telematic system (103) components, including the CPU (300) in the central controller (207) for on-board computing, allowing for a synchronized system command and response between the user and the vehicle or machine. Additionally, the Ethernet can be used to enhance the communication between these devices and the user. One or more LCD terminals can be used depending upon user preference and the range of telematic equipment. The LCD terminals (615) can have touch screen displays allowing the user to interact with the telematic system (103) by pressing icons on an LCD screen. Additional outgoing data also can include audio messages to the user. The outgoing data can be customized regionally and updated over the life of the vehicle (100), thus supporting new telematic or electronic equipment that can be added on after vehicle (100) manufacture or purchase by the user. The vehicle multimedia bus (600) can interface with a range of telematic equipment that includes after-market equipment added on by the user.

Incoming data to the telematic system (103) includes Global Positioning System (GPS) navigation (601), additional telematic services (602), radio/TV (603) reception, phone (604), indoor wireless (605) system that can connect to user personal digital assistant (PDA) (610), AM/FM digital audio broadcast/digital multimedia broadcast (DAB/DMB) (616), satellite digital video broadcast (DVB) (617), and global system for mobile communication/universal mobile telecommunications system (GSM/UMTS) (618). Additional units in the telematic system (103) include radar sensors (606), camera systems (607), audio digital signal processing (DPS) system (608), and CD/DVD (609). The microprocessor (304) controls or provides all or many of the control functions of the telematic system (103).

The telematic system (103) combines wireless communication with GPS navigation (601) and embedded computing to deliver up-to-date information, onboard computing navigation, and security to the user. Through the GPS navigation (601), the user can receive through the LCD terminal (615) navigational, wheel-speed, and engine-speed information. The GPS navigation (601) can also provide the user with current traffic conditions, driving maps and directions, and speed and fuel efficiency data. In an emergency, this system can provide rescue services with the exact location of the vehicle.

Telematic services (602) include optional add-on systems available to the user depending on user preference. For example, in road-tolling regions, electronic road-tolling systems may exist that require compatible equipment and software programs on board user vehicles. These systems have the capacity to be updated by the user. Other applications include voice recognition mechanisms or other biometric identifiers that enable a set of preset conditions to be enabled automatically upon user identification. Examples include preset temperatures for the air conditioning or heater unit. Sensors (205) in the vehicle may sense external or internal ambient temperature and react to either heat or cool the vehicle (100) correspondingly.

Telematic services (602) may include adaptive network-accessible or electronically distributed services such that a vehicle telematic appliance or mobile user communicates or transacts with Internet, remote server, access point, or other nearby peer or service vehicle, for example, to detect or indicate automatically when electrical power usage is running high, telematic or power system failure or emergency condition, or energy reserves are low, such that additional vehicle or portable modular fuel cell supplies are accessed or delivered locally responsively or dynamically in the jurisdiction, location or area where the vehicle is traveling currently.

Optionally web-based wireless telematic services (602) may transmit and receive structured or unstructured tagged or untagged data and/or control document, instructions or signals with one or more telematic appliances (103) as coordinated programmably by controller (206) with such remote network nodes, for example, in a user personalized process such that telematic appliance (103) and fuel cell (200) loading or usage are correspondingly monitored, sensed, controlled or serviced adaptively locally or remotely.

The radio/TV (603) receives AM/FM DAB/DMB (616) from emitting sources in the area the vehicle (100) travels. Satellite DVB (617) allows local area television programming as well as digital cable television to be viewed on monitors within the vehicle. For example, a user can receive pay-per-view broadcasts from the vehicle (100).

The phone (604) is enabled by GSM/UMTS (618), which allows the user telephone to access to different countries from the vehicle (100). The phone (604) also allows for verbal communication between the user and remote operators capable of vehicle diagnostic tests, location information, safety information, and security information. Additionally, users can use the phone (604) as a convention cell or mobile phone.

Indoor wireless (605) uses the universal serial bus (USB) (613), Ethernet (614) or other computer interconnection, mesh, or grid interface to allow the user to connect to portable devices such as PDA (610) to synchronize, upload, or download files. Optionally, Bluetooth or other wireless radio interface, such as IEEE 802.11/15 (ultrawideband) protocol, can be used in place of or in combination with the Ethernet (614).

Radar sensors (606) work in conjunction with camera systems (607), wherein together both units utilize a storage unit (619) with a controller (620) and a memory (621) for storing data comprising vehicle-user situational awareness. Vehicle-user situational awareness includes lane departure warnings, blind-spot detection, pre-crash sensing, active cruise control, parking slot measurement, and radar parking and reversing aid.

Audio DSP system (608) can be used for voice-activated commands of telematic functions in the telematic system (103). This is an alternative to the touch screen on LCD terminals (615) or can be used in conjunction with the touch screen on LCD terminals (615). For example, the user can navigate a touch screen menu in which the icon functions also respond to voice activated commands via the audio DSP system (608).

On-board CD/DVD (609) can be connected to the vehicle media bus (600) via the USB (613), MOST (611), or IDB (612) interfaces. This system allows the user to listen to CDs or view DVDs or other format media on the vehicle entertainment units. The CD/DVD (609) can also provide access to the central controller's (206) CD-ROM player, where MP3 or other media format music files can be stored. MP3 music files can be sent to the vehicle (100) audio system for playback via the CD/DVD (609) interface.

Figure 7:
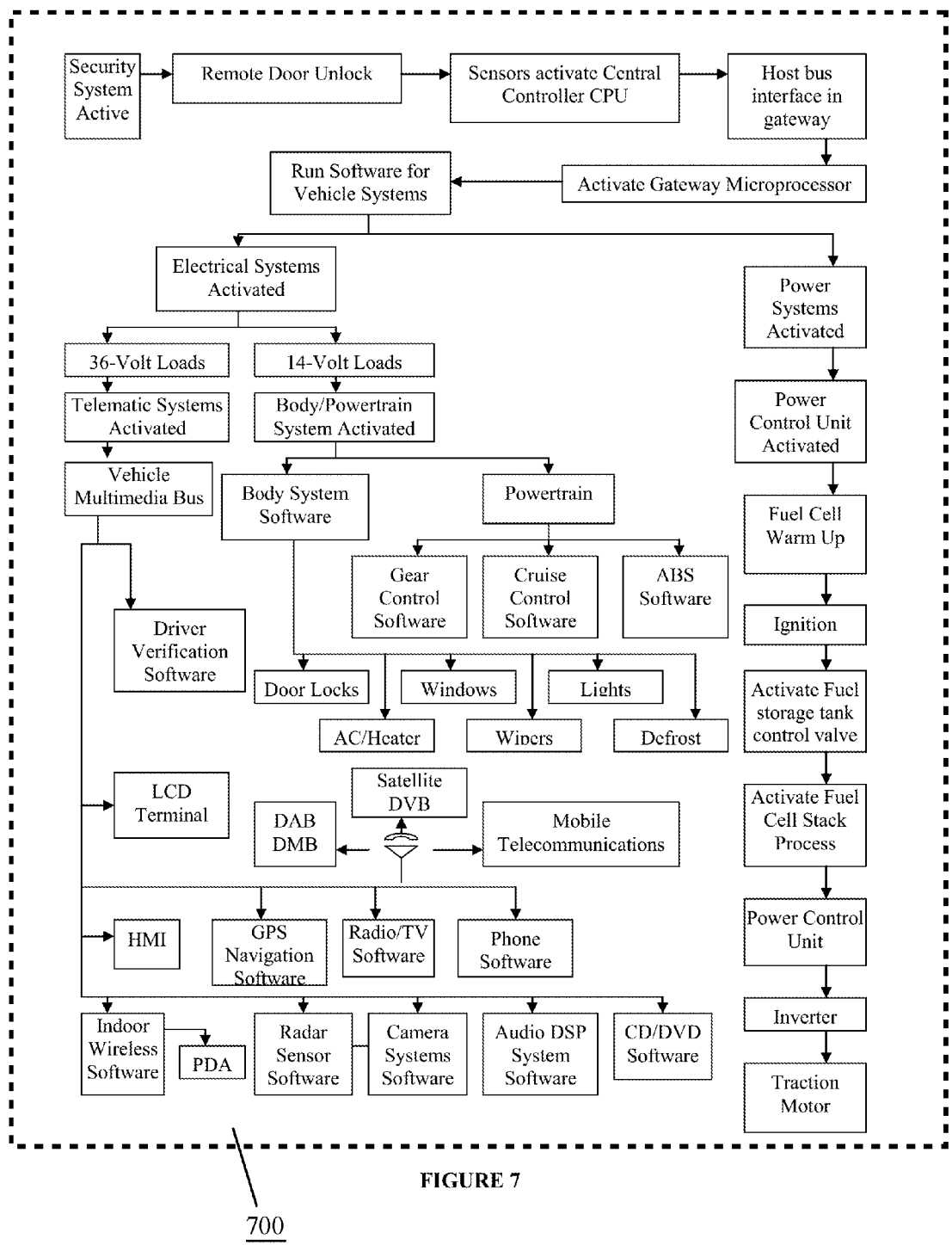
FIG. 7 is an operational flowchart illustrating process steps performed by software functions in accordance with telematic and power functions in a vehicle system according to an embodiment of the present invention.

FIG. 7 shows an operational flowchart (700) for software functionality. Software (302) for theft avoidance branch of the security system (503) for the vehicle (100) is triggered when activated by the user during periods of vehicle non-operation. The software (302) detects open doors or ignition attempts by unauthorized users not possessing the vehicle key. The software (302) can recognize the user's vehicle key to be a conventional metal key, or alternatively the key can be a remote control button from a hand-held key device assigned to the user. Optionally, the software (302) can recognize user codes on a keypad next to the door handle as well as a code on a keypad for the ignition. The software (302) saves the user the added expense of the conventional exterior alarm system and can save the user from higher insurance premiums. Deterring potential thieves also increases safety. When the software (302) recognizes the user's key, or the user's code on a keypad, the software automatically unlocks the vehicle door for user entry. The software (302) likewise enables the ignition when it recognizes the user's key, or the user's code on a keypad. If the software (302) does not recognize the key or code on the keypad, it triggers an alarm. The alarm can be audio, visual (such as flashing lights), or telephonic. The telephonic alarm alerts the user, police, or local operators having wireless communication to the vehicle via the telematic system (103). This communication can be via user, police, or operator cell phones or alternatively can be via the user's remote control handheld key device.

Both the alarm and the door unlock functions enabled by the software trigger sensors that activate the CPU (300) in the central controller (206). The sensors can be optical or magnetic sensors that sense if the vehicle doors have been opened or if they remain closed. The central controller (206) is in stand-by mode when the vehicle is not in use, but the security system is still active as initiated by the user. The CPU (300) in the central controller (206) activates the microprocessor (304) in the gateway (207) via the host bus interface (303). The microprocessor (304) runs additional software (302) that activates the power system (101), the electrical system (102), the telematic system (103), and the body/powertrain control system (204).

Software (302) in the power control unit (201) manages the distribution of electric power of the fuel cell stack (200) and the lithium-ion battery (203). For example, the software (302) determines if the fuel cell stack may need electricity from the lithium-ion battery (203) to assist with internal warm-up in the stack (200) before ignition. This increases performance by reducing the amount of start-up time required by the fuel cell stack (200) before ignition. Additionally, the software (302) distributes electricity from the lithium-ion battery (203) to assist the fuel cell stack (200) increase output during periods of acceleration. This increases vehicle (100) safety as well by assuring the vehicle (100) consistently maintains the required power for the traction motor (204) in mountainous or similar geographic terrain. The user saves cost by not having to purchase larger motors or larger fuel cell stacks to receive desired performance.

When the user activates ignition, the software (302) opens the fuel storage tank (211) and the air intake system (209) and channels the fuel through the fuel system (210) and oxygen through the air intake system to the fuel cell stack (200). The software (302) can determine the amount of fuel required for ignition and operation in selective terrains. For example, these can be either pre-set conditions programmed in the software (302) or the user can program the software (302) to feed more or less fuel to the fuel cell stack depending on the desired terrain, increasing vehicle performance and safety. The software (302) can also detect leaks in the either the fuel system (210), the air intake system (209), or the fuel storage tank (211) using optical and magnetic sensors, and alert the user on the LCD terminal (615). Optionally, an audio message can alert the user while in the vehicle (100). Alternatively, if leaks are detected by the sensors, the software (302) closes the fuel storage tank (211) to stop fuel flow and command the vehicle to use electricity from the lithium-ion battery (203). This increases safety by reducing the amount of volatile fuel leaked to potentially hazardous locations in the vehicle (100). Safety is also increased by the lithium-ion battery (203) serving as an auxiliary source of power for the vehicle when it cannot rely on fuel for electricity.

In normal ignition conditions, the software (302) will manage the electro-chemical process in the fuel cell stack (200)

and direct the electricity from the fuel cell stack (200) to the power control unit (201). From there the electricity is channeled through the inverter (202) and turns the traction motor (204). The software (302) can detect if sufficient electricity is traveling through the inverter (202) by way of optical and magnetic sensors. If the software (302) detects a lack of sufficient electricity, an alert can be sent to the user denoting such an error. The software (302) uses information collected from the sensor (205) in the traction motor (204) to provide the user with speed and tachometer information.

The software (302) activates the electrical system (103) which divides the electric loads into 36-volt loads (401) for the telematic system (103) and 14-volt loads (404) for the body/powertrain control system (104). The software (302) is able to manipulate this proportion if either the telematic system (103) or the body/powertrain control system (104) necessitate additional electric power. This increases system performance by providing immediate electric power to needy systems and reduces the cost of extra batteries to supply temporarily overburdened systems. Safety is preserved in this situation by providing user access and control to all telematic or body/powertrain functions in a consistent manner during vehicle operation.

The body branch and the powertrain branch of the body/powertrain system (104) can each have their own software (302) packages. The software uses optical or magnetic sensors for the body systems (501) to operate components such as automatic door locks. The door locks can be integrated as part of the vehicle security system as explained above. Power windows, interior lights, exterior lights, turn signals, windshield wipers, heater, electronic air conditioning, electronically heated seats, airbag deployment, and defrost mechanisms can also be enabled and controlled by software. For example, sensors in the vehicle (100) may detect a certain amount of moisture from raindrops and detect that windows or doors are left ajar after vehicle (100) operation. The software can either automatically close the windows or doors or provide the user with audio or visual alarms.

Similarly, if sensors in the vehicle (100) detect an absence of sunlight surrounding the vehicle, and the user failed manually to activate the headlights, the software can either automatically close the windows or doors or provide the user with audio or visual alarms. This would increase safety in instances when the user failed to turn on the headlights at dusk or at other times during the night. Optionally, solar cells in the vehicle (100) headlights could be used to detect the absence of sunlight as opposed to sensors.

The air conditioning and heater unit of the body system (501) can be pre-set by software parameters to engage upon a verbal command or other biometric identifiers in the vehicle. Sensors (205) in the vehicle may sense a certain external or internal ambient temperature and react to either heat or cool the vehicle (100) correspondingly.

Optionally, the wipers and defrost may be activated by the software if sensor detect moisture on the windshield or frost on the rear window. The software can be programmed with variations in parameters to be activated or deactivated according to climate or geography depending on vehicle location and use. These software functions increase vehicle performance and safety by compensating for careless users who do not activate these functions manually.

Software can supervise the powertrain (502) and gear control (503) branches of the body/powertrain control system (104) to allow the user to opt for on-the-fly or in-motion manual control of the transmission as opposed to automatic control by the vehicle or software. ABS software determines the terrain on which the vehicle is traveling and gages the antilock mechanism based upon preset conditions for variation in terrain and pavement condition. For example, the ABS would perform according to a certain set of conditions for wet pavements and according to a different set of conditions for dry pavements. Additional presets can include snowy or sandy surfaces. This increases safety and vehicle performance according to variations in whether, climate, or geography and reduces costs associated with a reduction accident damages.

Software (302) controlled cruise control works in conjunction with radar sensors (606) and camera systems (607) to provide the user with an active cruise control that detects the acceleration or deceleration of a traveling vehicle ahead of the user's vehicle (100). As the lead vehicle accelerates or decelerates, the software commands the user's vehicle to accelerate or decelerate with the same magnitude. This increases safety for the user by allowing a constant buffer between the user's vehicle and the lead vehicle. Additionally, software (302) can assist the user with vehicle operation in the same manner by provide the user with lane departure warnings, blind-spot detection, pre-crash sensing, and active cruise control, parking slot measurement, and radar parking and reversing aid.

Software (302) can control the local interconnect network protocol from the central controller (206) to the vehicle multimedia bus (600). Software (302) is used for driver verification as a prerequisite to full telematic activation. Optionally, ignition of the traction motor (204) can be prevented by the software (302) as a security device if the voice recognition software does not recognize a registered user.

Software (302) can manage the HMI (616) and LCD terminals (615) for efficient graphical user interface display for the user and provide the user control access to telematic components as well as the CPU (300) in the central controller (207). The LCD software enables the user to use screen technology. Optionally, the user may use the HMI for telematic control. HMI (616) may employ various biometric or biosensor/actuator devices to enhance or enable human machine interface. The software (302) can be customized depending on user preference based on a desired complexity level. Additionally, the software (302) can be updated over the life of the vehicle to support new telematic or electronic equipment that can be added on after manufacture.

Software (302) can run the GPS navigation (601), additional telematic services (602), radio/TV (603) reception, phone (604), indoor wireless (605) system that can connect to PDA (610), AM/FM digital audio broadcast/digital multimedia broadcast (616), satellite digital video broadcast (617), global system for mobile communication/universal mobile telecommunications system (618), radar sensors (606), camera systems (607), audio digital signal processing (DPS) system (608), and CD/DVD (609), or each can maintain its own software.

Software combines with wireless communication to run GPS navigation (601) in order to deliver up-to-date information, onboard computing navigation, and security to the user. GPS navigation (601) software allows the user to receive through the LCD terminal (615) navigational, wheel-speed, and engine-speed information. The software can also provide the user with current traffic conditions, driving maps and directions, and speed and fuel efficiency data. Additionally, the software can provide rescue services with the exact location of the vehicle in emergency situations.

Software enables optional or add-on telematic services (602) electronic road-tolling systems that recognize individual vehicles, and charges the toll to the vehicle account. Software enables the user to keep track of the electronic account and pay online from inside the vehicle. Other applications include voice recognition software or other biometric identifier software that enables the user to define a set of preset conditions within the vehicle that conform to user standards upon recognition. Examples include preset temperatures for the air conditioning or heater unit, seat height and steering wheel protrusion, and an automatic or manual transmission.

The radio/TV (603) software manages AM/FM DAB/DMB (616) and satellite DVB (617) received from emitting sources in the area and allows the user to select channels via verbal commands or touch screen selection on the LCD terminals (615).

The phone (604) software manages mobile telecommunications information and distinguishes for the user personal telephone calls from emergency or diagnostic calls from remote operators.

Indoor wireless (605) software allows the user to use the connect to portable devices such as PDA (610) or laptops to synchronize, upload, or download files. The software can be compatible with Bluetooth interface.

Audio DSP system (608) software enables the user to create and use voice-activated commands of telematic functions in the telematic system (103). This software can be used in conjunction with the touch screen software on LCD terminals (615). For example, the software can allow the user to navigate a touch screen menu in which the icon functions and respond to voice activated commands at the same time.

On-board CD/DVD (609) software allows the user to burn or listen to CDs or view DVDs on the vehicle entertainment units. The CD/DVD (609) software can also provide access to the central controller's (206) CD-ROM player, where MP3 music files can be stored. The software allows MP3 music files to be sent to the vehicle (100) audio system for playback via the CD/DVD (609) interface.

Optical, electric, and electromagnetic links within the power system (101), an electrical system (102), a telematic system (103), and a body/powertrain control system (104) may be redundant. This is made possible through redundant sensor configuration throughout the system.

For example, a failed LED in a sensor (205) can cause the system to operate in an unsafe manner. For instance, a safety lid that remains open during machine operation. A remedy for failed LED in the sensor (205) includes two sensors for the lid, one that's blocked when the lid is open and one that's blocked when the lid is closed. For operational functionality, both sensors (205) must be in the correct (lid closed) position.

Sensors (205), including optical sensors, magnetic sensors, and optical isolator sensors can be placed in devices and mechanisms in vehicle (100) systems as mentioned above. Sensors in the power control unit (201), the fuel cell stack (200), the central controller (206), the gateway (207), security systems (503), gear control (504), GPS navigation (601), telematic systems (602) units, storage unit (619), and indoor wireless (605) can have chips in them that aid software (302) functions.

Figure 8:
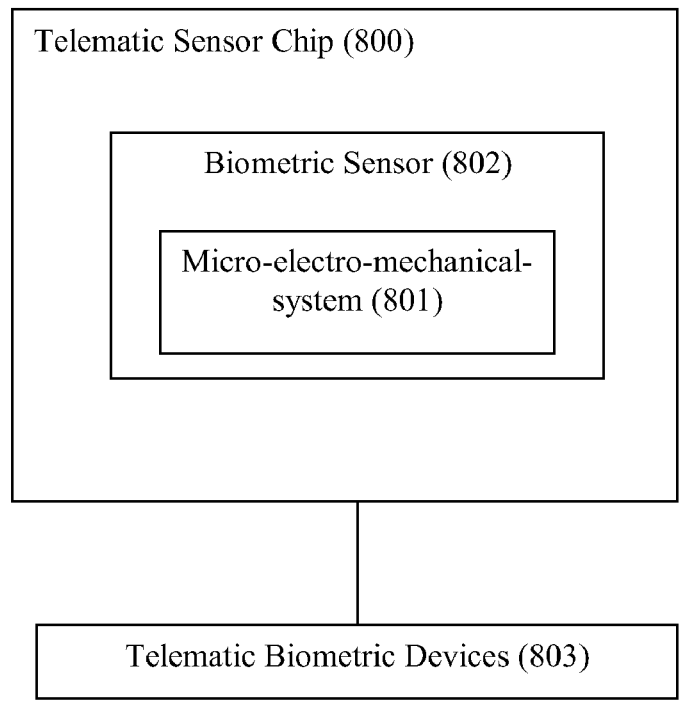
FIG. 8 is an architectural diagram illustrating a telematic sensor chip according to an embodiment of the present invention.

FIG. 8 represents a telematic sensor chip (800) comprising a micro-electro-mechanical-system (801) in a biometric sensor (802). The micro-electro-mechanical-system (801) enables the biometric sensor (802) to detect and match vibrations from the user's voice to determine user identity. The biometric sensor (802) sends a command to the telematic biometric devices (803) that either allows or disallows the user access to activate and control devices in the telematic system (103) depending on user identity verification.

Additionally, the micro-electro-mechanical-system (801) enables the biometric sensor (802) to detect and match fingerprints or thumb prints from the user's hand to determine user identity. The biometric sensor (802) sends a command to the telematic biometric devices (803) that either allows or disallows the user access to activate and control devices in the telematic system (103) depending on user identity verification.

Additionally, the micro-electro-mechanical-system (801) enables the biometric sensor (802) to detect and match retinal scan of the user's eyes to determine user identity. The biometric sensor (802) sends a command to the telematic biometric devices (803) that either allows or disallows the user access to activate and control devices in the telematic system (103) depending on user identity verification.

Micro-electro-mechnical-system (801) or biometric device (802) may include, couple to, or be provided with single or multiple array of discrete or integrated structures including surface acoustic wave interdigitated transducer or sensor, microactuator, microaligner, accelerometer, transducer, microgyroscopes, cantilever beam or micromanipulator, thin membrane, rotor or microgear, micromotor, micronozzle, microgripper, microphone, microbridge, microresonator, micropump, microarray or biogenetic sensor, pressure/strain gauge, micronose or gas sensor, torsion mirror, thermopile, and/or microsensor using material such as silicon, polysilicon, germanium, carbon, gallium arsenide, quartz, silicon carbide, silicon nitride, alumina, sapphire, or silicon dioxide.

For example, microsensor may detect, sense or measure mechanical measurands, such as vehicle, user, or telematic appliance acceleration or velocity using microbridge or microresonator, acoustic energy or sound level using microphone, altitude or position displacement using capacitor or global positioning satellite receiver, roll or yaw using microgyroscope or accelerometer, pressure or temperature, shock or vibration, or force or torque using microcantilever.

Generally vehicle telematic system (103) and automated software control process electronically integrates power system (101) using controller (206), fuel cell stack or module (200), and one or more telematic appliances (103). Such telematic or control functions may be implemented in one or more digital or analog local or remote software, firmware, hardware, reconfigurable logic, or simulation models, or partitioned or redundant fixed or programmable combination thereof.

Preferably controller (206) couples electrical power from fuel cells (200) adaptively to selected telematic appliance (103). As understood and defined herein term "adaptive" or "adaptively" is interpreted broadly and understood generally to mean or refer to operational capability including one or any function that responds, adjusts, aligns, or corrects reactively to environmental, context, control or data signal, pattern, or other stimuli or feedback, or predicts or extrapolates proactively according to prior or current environmental, context, control or data signal, pattern or other stimuli or feedback, for example, to mimic, self-learn, compensate, repair, diagnose, adjust, change, compensate, tailor, or otherwise structurally or functionally modify.

Optionally controller (206) causes electrical power from fuel cell module (200) to be stored in lithium-ion or other rechargeable battery or energy storage. Fuel cell components may be coupled or packaged in modular assembly for easy access and connection either embedded to vehicle or portable for motile handling with certain detachable telematic appliances.

Optionally controller (206) configures fuel cell module (200) to generate 42-volt, 14-volt, or other voltage electrical power, as may be used by one or more telematic appliance (103).

Optionally controller (206) couples to fuel cell module (200) or telematic appliance (103) through shared connection or other electrical interconnect, wire, bus or channel, through which synchronous or asynchronous control signal and/or power signals are provided or transmitted simultaneously or at separate times.

Optionally controller (206) couples electrical power from a generator, solar cell, or other electrical power generation source as backup auxiliary to one or more telematic appliance (103).

Optionally controller (206) controls electrical power in response to a sensor signal provided by telematic appliance (103). Sensor signal may represent fault or error condition, media format or load, or location or jurisdiction of telematic appliance (103).

Optionally controller (206) adaptively controls electrical power reactively in response to measured quality of electrical power signal, proactively according to predicted function or scheduled service in telematic appliance (103).

Foregoing descriptions of specific embodiments of the invention have been presented for purposes of illustration and description. They are not intended to be exhaustive or to limit the invention to the precise forms disclosed. Modifications and variations are possible in light of the above teaching. For example, applicant contemplates that present invention may be applied for various purposes, such as economizing use and optimizing storage of fossil fuels or other non-fossil energy conservation, as well as bioinformatic/biohazard or other remote sensor application for homeland security and defense or anti-terrorist surveillance or control functions.

The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

The invention claimed is:

1. Integrated power and sensor-based gateway system comprising:
    a central controller coupled via a sensor-based gateway to an electrical system;
    wherein the sensor-based gateway comprises a programmable signal interconnect and router, the sensor-based gateway using at least one sensor and the central controller automatically using software-automated sensor data adaptively to control user interaction and enable communication through a vehicle multimedia interface via the sensor-based gateway according to a specified data rate and telematic navigational and security alert using local routing interconnect network protocol adaptively to control vehicle rescue;
    wherein the central controller using the software-automated sensor data adaptively controls electrical power provided through the gateway reactively in response to a measured quality of electrical power signal, and proactively according to a predicted function in a telematic appliance according to the specified data rate and the telematic navigational and security alert to enable rescue service using the software-automated sensor data and local routing interconnect network protocol adaptively according to vehicle location and the specified data rate.

2. System of claim 1 wherein a body and powertrain control system is coupled to a 14-volt load coupled to a 14-volt DC bus.

3. Integrated power and sensor-based gateway activation method comprising steps:
    activating a sensor-based gateway microprocessor to run software for vehicle systems;
    activating an electrical system;
    activating a power-system power control unit; and
    activating a battery, or fuel cell stack process;
    wherein the sensor-based gateway microprocessor comprises a programmable signal interconnect and router, the sensor-based gateway microprocessor using at least one sensor automatically using software-automated sensor data adaptively to control user interaction and enable communication through a vehicle multimedia interface via the sensor-based gateway according to a specified data rate and telematic navigational and security alert using local routing interconnect network protocol adaptively to control vehicle rescue;
    wherein the central controller using the software-automated sensor data adaptively controls electrical power provided through the gateway reactively in response to a measured quality of electrical power signal, and proactively according to a predicted function in a telematic appliance according to the specified data rate and the telematic navigational and security alert to enable rescue service using the software-automated sensor data and local routing interconnect network protocol adaptively according to vehicle location and the specified data rate.

4. Method of claim 3 wherein the power-system power control unit couples the battery or fuel cell stack via an inverter to a traction motor.

\* \* \* \* \*

(12) INTER PARTES REEXAMINATION CERTIFICATE (1318th)
United States Patent
Fernandez

(10) Number: US 7,980,341 C1
(45) Certificate Issued: Aug. 1, 2016

(54) TELEMATIC METHOD AND APPARATUS WITH INTEGRATED POWER SOURCE

(76) Inventor: Dennis Sunga Fernandez, Atherton, CA (US)

Reexamination Request:
No. 95/002,259, Sep. 14, 2012

Reexamination Certificate for:
Patent No.: 7,980,341
Issued: Jul. 19, 2011
Appl. No.: 12/556,573
Filed: Sep. 10, 2009

Related U.S. Application Data

(60) Division of application No. 12/237,977, filed on Sep. 25, 2008, now Pat. No. 7,621,361, which is a continuation of application No. 11/288,724, filed on Nov. 28, 2005, now Pat. No. 7,374,003, which is a continuation of application No. 10/626,877, filed on Jul. 23, 2003, now Pat. No. 7,353,897.

(51) Int. Cl.
*B60W 20/00* (2016.01)
*B60L 11/18* (2006.01)
*B60L 15/20* (2006.01)
*B60L 1/00* (2006.01)

(52) U.S. Cl.
CPC ............. *B60L 11/1881* (2013.01); *B60L 1/00* (2013.01); *B60L 11/1892* (2013.01); *B60L 11/1894* (2013.01); *B60L 15/2045* (2013.01); *B60L 2240/622* (2013.01); *B60L 2250/10* (2013.01); *B60L 2250/30* (2013.01); *Y02T 10/645* (2013.01); *Y02T 10/72* (2013.01); *Y02T 10/7283* (2013.01); *Y02T 10/7291* (2013.01); *Y02T 90/16* (2013.01); *Y02T 90/161* (2013.01); *Y02T 90/162* (2013.01); *Y02T 90/34* (2013.01); *Y10S 903/944* (2013.01)

(58) Field of Classification Search
None
See application file for complete search history.

(56) References Cited

To view the complete listing of prior art documents cited during the proceeding for Reexamination Control Number 95/002,259, please refer to the USPTO's public Patent Application Information Retrieval (PAIR) system under the Display References tab.

*Primary Examiner* — Anjan Deb

(57) ABSTRACT

Telematic method and apparatus adaptively uses fuel cell power source in vehicle with integrated power system, electrical system, telematic system, and body/powertrain system. Telematic communications systems including internet, digital video broadcast entertainment, digital audio broadcast, digital multimedia broadcast, global positioning system navigation, safety services, intelligent transportation systems, and/or universal mobile telecommunications system. Network-accessible software enables integrated modular function for automated control and provision of fuel cell resources for telematic appliance and/or other vehicle electro-mechanical devices.

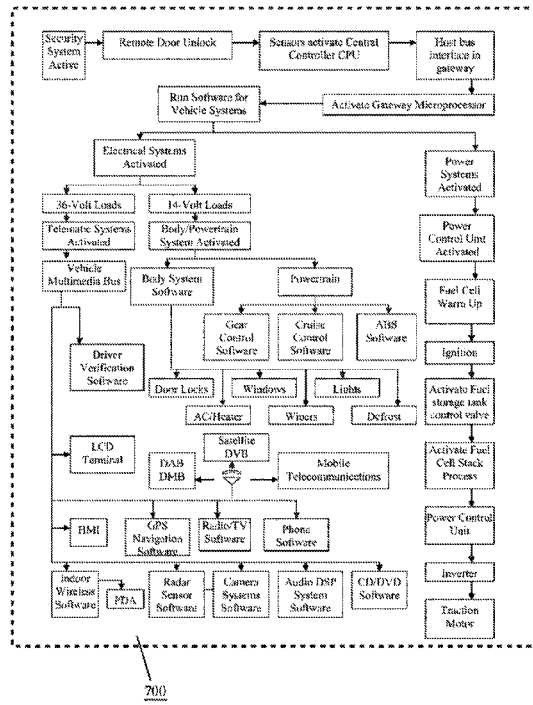

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-4 are cancelled.

* * * * *